(12) United States Patent
Kamon et al.

(10) Patent No.: US 12,397,428 B2
(45) Date of Patent: *Aug. 26, 2025

(54) ROBOT SYSTEM AND METHOD OF CONTROLLING THE ROBOT SYSTEM

(71) Applicant: KAWASAKI JUKOGYO KABUSHIKI KAISHA, Kobe (JP)

(72) Inventors: Masayuki Kamon, Kobe (JP); Hideyuki Ryu, Kobe (JP); Jun Fujimori, Kobe (JP); Hiroki Kinoshita, Kobe (JP); Hiroki Takahashi, Kobe (JP); Takuya Shitaka, Kobe (JP); Kai Shimizu, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/664,497

(22) Filed: May 15, 2024

(65) Prior Publication Data

US 2024/0300108 A1    Sep. 12, 2024

Related U.S. Application Data

(63) Continuation of application No. 17/414,979, filed as application No. PCT/JP2019/049916 on Dec. 19, 2019, now Pat. No. 12,011,834.

(30) Foreign Application Priority Data

Dec. 21, 2018  (JP) .................................. 2018240132
Dec. 21, 2018  (JP) .................................. 2018240133

(51) Int. Cl.
*B25J 13/02*    (2006.01)
*B25J 3/00*    (2006.01)
(Continued)

(52) U.S. Cl.
CPC ............... *B25J 9/1664* (2013.01); *B25J 3/00* (2013.01); *B25J 9/1633* (2013.01); *B25J 9/1651* (2013.01); *B25J 13/085* (2013.01)

(58) Field of Classification Search
CPC . B25J 9/1664; B25J 3/00; B25J 9/1633; B25J 9/1651; B25J 13/085; B25J 3/04; B25J 9/1689; B25J 13/025
See application file for complete search history.

(56) References Cited

U.S. PATENT DOCUMENTS 5,949,686 A  *  9/1999  Yoshinada .................. B25J 3/04
                                                    700/260
9,492,927 B2 * 11/2016  Diolaiti .................. A61B 34/37
(Continued)

FOREIGN PATENT DOCUMENTS

WO    WO-2015154172 A1  * 10/2015  ............... B25J 3/04
WO    WO-2018087123 A2  *  5/2018  ............ B25J 13/025
(Continued)

*Primary Examiner* — Adam R Mott
*Assistant Examiner* — Heather J Keniry
(74) *Attorney, Agent, or Firm* — METROLEX IP LAW GROUP, PLLC; Robert L. Scott, Esq.

(57) ABSTRACT

A robot system (100) includes a slave unit (1) including a slave arm (11) having a working end (11a), a slave arm actuator (13) configured to drive the slave arm, and a slave-side controller (14) configured to control the slave arm actuator based on a slave operating command for defining a target position of the working end, a master unit (2) including a master arm (21) having a manipulation end (21a) into which the content of manipulation is inputted by an operator, and a system controller (3) configured to generate the slave operating command based on the content of manipulation inputted into the manipulation end. When a command corresponding to the content of manipulation is a command corresponding to a limit equivalent range corresponding to a limit of operation of at least one of the slave arm and the (Continued)

master arm, the system controller performs processing to give perception to the operator.

9 Claims, 9 Drawing Sheets

(51) Int. Cl.
*B25J 3/04* (2006.01)
*B25J 9/16* (2006.01)
*B25J 13/08* (2006.01)

(56) References Cited

U.S. PATENT DOCUMENTS

| | | | |
|---|---|---|---|
| 2007/0142825 A1* | 6/2007 | Prisco | A61B 34/70 606/1 |
| 2015/0366624 A1* | 12/2015 | Kostrzewski | A61B 34/76 606/130 |
| 2017/0001301 A1* | 1/2017 | Kamiya | B25J 9/1633 |
| 2018/0055577 A1* | 3/2018 | Barral | B25J 9/1633 |
| 2019/0201136 A1* | 7/2019 | Shelton, IV | G16H 50/20 |

FOREIGN PATENT DOCUMENTS

| | | | | |
|---|---|---|---|---|
| WO | WO-2018201240 A1 * | 11/2018 | | B25J 13/006 |
| WO | WO-2018212265 A1 * | 11/2018 | | B25J 13/085 |

\* cited by examiner

ROBOT SYSTEM AND METHOD OF CONTROLLING THE ROBOT SYSTEM

This application is a continuation application of U.S. application Ser. No. 17/414,979, filed on Jun. 17, 2021, which is based upon and claims the benefit of priority from the prior Japanese Patent Application No. 2018-240132 and No. 2018-240133, both filed on Dec. 21, 2018, the entire contents of all of which are incorporated herein by reference.

TECHNICAL FIELD

The present disclosure relates to a robot system and a method of controlling the robot system.

BACKGROUND ART

Conventionally, a master-slave manipulator and a method of controlling the same are known.

For example, Patent Document 1 discloses a master-slave manipulator which, when a reaction force measured by a force sensor exceeds a target force value set beforehand, inhibits operation of a slave arm so that the slave arm does not follow operation of a master arm in a force controlling direction set beforehand. The force controlling direction is a direction set substantially in agreement with a normal direction of a work object, and is a direction toward the work object and a direction away from the work object. The slave arm is operated by a force control so that the target force value set beforehand becomes equal to the reaction force measured by the force sensor.

Moreover, Patent Document 2 discloses a master-slave manipulator having a slave arm which follows the shape of a master arm so that the shape of the slave arm becomes similar to the shape of the master arm, by operating the master arm. A contact is provided to the master arm, and this contact contacts a position regulating member to regulate an operating range of the master arm.

REFERENCE DOCUMENTS OF CONVENTIONAL ART

Patent Documents

[Patent Document 1] JP 1996-281573A
[Patent Document 2] JP 1995-124876A

DESCRIPTION OF THE DISCLOSURE

Problems to be Solved by the Disclosure

However, according to the master-slave manipulator disclosed in Patent Document 1, for example, in a case where the slave arm is in contact with a hard work object, when an operator tries to forcibly move the master arm in a direction corresponding to a direction of the slave arm moving toward the work object, an excessive load is applied to the master arm, and therefore, the force sensor or the master arm may be damaged.

Moreover, according to the master-slave manipulator disclosed in Patent Document 2, when the slave arm contacts a workpiece, it cannot notify the operator about the contact. It may be difficult for the operator to distinguish whether the slave arm contacts the workpiece and operation of the slave arm is regulated, or the contact contacts the position regulating member and the operating range of the master arm is regulated.

One purpose of the present disclosure is to provide a robot system and a method of controlling the robot system, which enables the operator to perceive an operating limit of at least one of a master arm and a slave arm.

Summary of the Disclosure

In order to achieve the purpose, a robot system according to one aspect of the present disclosure includes a slave unit including a slave arm having a working end, a slave arm actuator configured to drive the slave arm, and a slave-side controller configured to control the slave arm actuator based on a slave operating command for defining a target position of the working end, a master unit including a master arm having a manipulation end into which the content of manipulation is inputted by an operator, and a system controller including a slave operating command generating module configured to generate the slave operating command based on the content of manipulation inputted into the manipulation end. When a command corresponding to the content of manipulation is a command corresponding to a limit equivalent range corresponding to a limit of operation of at least one of the slave arm and the master arm, the system controller performs processing to give perception to the operator.

Effect of the Disclosure

According to the present disclosure, it is possible to enable the operator to perceive the limit of operation of at least one of the master arm and the slave arm.

MODES FOR CARRYING OUT THE DISCLOSURE

Figure 1:
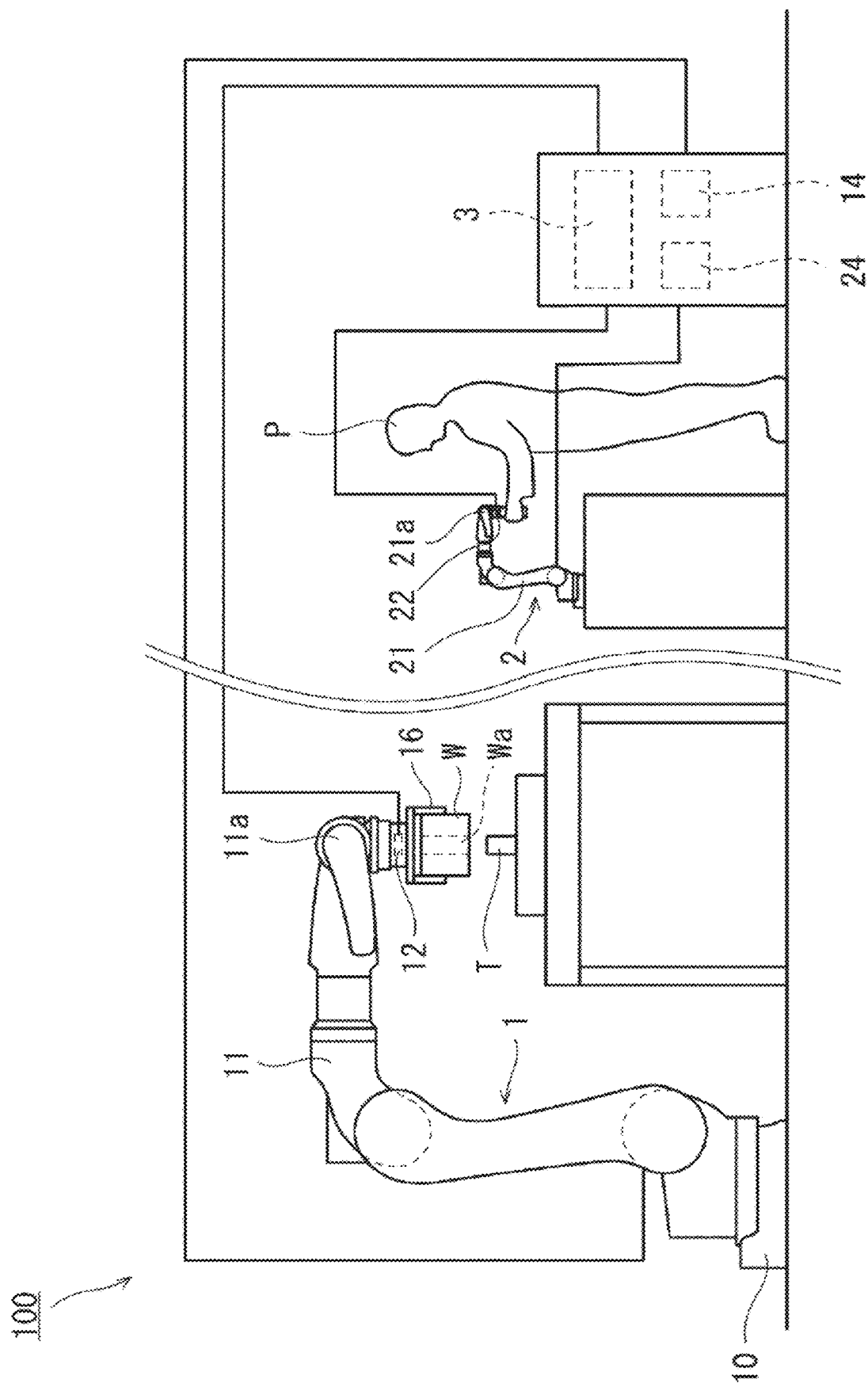
FIG. 1 is a view schematically illustrating one example of a configuration of a robot system according to Embodiment 1.

First, one example of each aspect of the present disclosure is described. A robot system according to one aspect of the present disclosure includes a slave unit including a slave arm having a working end, a slave arm actuator configured to drive the slave arm, and a slave-side controller configured to control the slave arm actuator based on a slave operating command for defining a target position of the working end, a master unit including a master arm having a manipulation end into which the content of manipulation is inputted by an operator, and a system controller including a slave operating command generating module configured to generate the slave operating command based on the content of manipulation inputted into the manipulation end. When the command corresponding to the content of manipulation is a command corresponding to a limit equivalent range corresponding to a limit of operation of at least one of the slave arm and the master arm, the system controller performs processing to give perception to the operator.

According to this aspect, the robot system can notify the operator, through the giving of perception, that the command corresponding to the content of manipulation is the command corresponding to the limit equivalent range. Thus, the robot system can enable the operator to perceive the limit of operation of at least one of the master arm and the slave arm.

In the robot system according to one aspect of the present disclosure, the slave unit may further include a slave-side force detector configured to detect a direction and a magnitude of a reaction force acting on the working end or a workpiece held by the working end. The master unit may further include a master-side force detector configured to detect a direction and a magnitude of an operating force applied by the operator to the manipulation end as the content of manipulation, a master arm actuator configured to drive the master arm, and a master-side controller configured to control the master arm actuator based on a master operating command for defining a target position of the manipulation end. The system controller may generate, based on the operating force and the reaction force, the slave operating command and the master operating command for moving the manipulation end in a moving direction corresponding to a moving direction of the working end of the slave operating command. When the system controller determines that the magnitude of the operating force is included in a range exceeding a first threshold as the limit equivalent range, the system controller may generate the master operating command for moving the manipulation end in the direction of the operating force.

According to this aspect, the robot system can inform the operator, through the master arm, that the magnitude of the operating force exceeds the given first threshold, and can inform the operator that the master arm is overloaded. Moreover, the robot system can reduce the load on the master arm and the master-side force detector by moving the manipulation end in the direction in which the operator applied the force. Therefore, the damage to the master arm and the master-side force detector can be prevented. As a result, it can be prevented that the operator breaks the master arm.

In the robot system according to one aspect of the present disclosure, the system controller may generate the master operating command for increasing a change in a moving velocity of the manipulation end as the operating force increases.

According to this aspect, the robot system can guide the operator about how much the operating force is to be weakened, and thus, the operator can be guided so as to appropriately weaken the operating force. Moreover, as the magnitude of the operating force increases, the manipulation end moves more quickly in the direction in which the operator applied the force. Therefore, the load on the master arm and the master-side force detector can be reduced more appropriately, and the damages to the master arm and the master-side force detector can be prevented more appropriately.

In the robot system according to one aspect of the present disclosure, the system controller may include an operating mode setting module configured to set an operating mode to one of a plurality of operating modes including a normal operating mode and an informing operating mode, a slave operating command generating module configured to generate the slave operating command based on the operating force and the reaction force, a first temporary master operating command generating module configured to generate a first temporary master operating command for moving the manipulation end in a moving direction corresponding to a moving direction of the working end of the slave operating command based on the operating force and the reaction force, a second temporary master operating command generating module configured to generate a second temporary master operating command based on the operating force, and a master operating command setting module configured to set the first temporary master operating command to the master operating command in the normal operating mode, and set the second temporary master operating command to the master operating command in the informing operating mode. When the operating mode setting module determines that the magnitude of the operating force is included in a range exceeding the first threshold, the operating mode setting module may set the operating mode to the informing operating mode.

According to this aspect, the robot system can appropriately inform the operator through the master arm by changing the operating mode from the normal operating mode to the informing operating mode. Moreover, the robot system can stop the slave arm as well as appropriately change the operation of the slave arm based on the operating force and reaction force detected by the detector, regardless of the set operating mode. Therefore, the robot system can avoid that the operation of the master arm upon informing the operator affects the operation of the slave arm, and as a result, it can appropriately inform the operator. In addition, since the robot system can change the operating mode automatically, an emergency stop for protecting the system can be avoided.

In the robot system according to one aspect of the present disclosure, the plurality of operating modes may further include a resuming operating mode. The system controller may further include a third temporary master operating command generating module configured to generate a third temporary master operating command for moving the manipulation end toward the target position of the manipulation end defined by the first temporary master operating command. The master operating command setting module may further set the third temporary master operating command to the master operating command in the resuming operating mode. When the operating mode setting module determines that the magnitude of the operating force is included in a range of a given second threshold or below in a state where the operating mode is set to the informing operating mode, the operating mode setting module may set the operating mode to the resuming operating mode.

According to this aspect, after informing the operator, the robot system can move the manipulation end so that the manipulation end and the working end have a given correlation.

In the robot system according to one aspect of the present disclosure, when the operating mode setting module determines that the manipulation end is located at the target position of the first temporary master operating command in a state where the operating mode is set to the resuming operating mode, the operating mode setting module may set the operating mode to the normal operating mode.

According to this aspect, the robot system can resume the manipulation end and the working end to the state where they operate synchronizedly having the given correlation. Moreover, it can resume the mode to the normal operating mode automatically so that the interruption of the work can be avoided.

In the robot system according to one aspect of the present disclosure, the system controller may include a converting module configured to calculate a target velocity vector based on the operating force and the reaction force, and a subconverting module configured to calculate a temporary target velocity vector based on the operating force. The slave operating command generating module may generate the slave operating command based on the target velocity vector. The first temporary master operating command generating module may generate the first temporary master operating command based on the target velocity vector. The second temporary master operating command generating module may generate the second temporary master operating command based on the temporary target velocity vector.

According to this aspect, in the robot system of a bilateral control system, the informing the operator can be performed appropriately.

The robot system according to one aspect of the present disclosure may further include an informing part configured to perform a notification by using sense information perceivable by the operator's perception. The master unit may further include a master-side force detector configured to detect a direction and a magnitude of an operating force applied by the operator to the manipulation end as the content of manipulation. When the system controller determines that the magnitude of the operating force is included in a range exceeding a third threshold as the limit equivalent range, the system controller may control the informing part to perform the notification to the operator.

According to this aspect, the robot system can inform the operator that the magnitude of the operating force exceeds the first threshold, and can inform the operator that the master arm is overloaded. As a result, it can be prevented that the operator breaks the master arm.

In the robot system according to one aspect of the present disclosure, the system controller may control the informing part so that an intensity of the sense information becomes stronger as the operating force becomes larger.

According to this aspect, the robot system can guide the operator about how much the operating force is to be weakened, and thus, the operator can be guided so as to appropriately weaken the operating force.

The robot system according to one aspect of the present disclosure may further include an informing part configured to perform a notification by using sense information perceivable by the operator's perception. When the system controller determines that the target position of the working end of the slave operating command is located in a notifying range as the limit equivalent range, that is a range spreading from a limit of a given operating range to the operating range side, the system controller may control the informing part to perform the notification to the operator.

According to this aspect, the robot system can notify the approaching of the working end to the limit of the operating range through the perception of the operator. Therefore, the operator can easily distinguish whether the working end contacts the workpiece, or whether the working end approaches the limit of the operating range or near the limit, and the work efficiency can be improved.

In the robot system according to one aspect of the present disclosure, the system controller may control the informing part so that an intensity of the sense information becomes stronger as a distance between the target position of the working end of the slave operating command and the limit of the operating range becomes smaller.

According to this aspect, the robot system can guide the operator about the distance to the limit of the operating range.

In the robot system according to one aspect of the present disclosure, the slave unit may further include a slave-side force detector configured to detect a direction and a magnitude of a reaction force acting on the working end or a workpiece held by the working end. The master unit may further include a master-side force detector configured to detect a direction and a magnitude of an operating force applied by the operator to the manipulation end as the content of manipulation, a master arm actuator configured to drive the master arm, and a master-side controller configured to control the master arm actuator based on a master operating command. The system controller may generate, at every given control period, the slave operating command for defining the target position of the working end and the master operating command for defining a target position of the manipulation end so that the target position of the slave operating command and the target position of the master operating command have a given correlation. When the system controller determines that the target position of the working end of the slave operating command is located in a notifying range as the limit equivalent range, that is a range spreading from a limit of a given operating range to the operating range side, the system controller may generate the master operating command to change the operation of the manipulation end.

According to this aspect, the robot system can notify the approaching of the working end to the limit of the operating range through an inner force sense of the operator. Therefore, the operator can easily distinguish whether the working end contacts the workpiece, or whether the working end approaches the limit of the operating range or near the limit, and the work efficiency can be improved.

In the robot system according to one aspect of the present disclosure, when the system controller determines that the target position of the working end of the slave operating command is located in the notifying range, the system controller may set a repulsive force acting on the working end in a direction separating from the limit of the operating range, and generate the master operating command based on a resultant force of the operating force, the reaction force, and the repulsive force in a subsequent control period.

According to this aspect, the robot system can notify the operator by the repulsive force about the approaching to the limit of the operating range. Moreover, based on the direction of the repulsive force, the robot system can appropriately guide the operator about the direction separating from the boundary.

In the robot system according to one aspect of the present disclosure, the system controller may set the repulsive force so that a magnitude of the repulsive force becomes larger as a distance between the target position of the working end of the slave operating command and the limit of the operating range becomes smaller.

According to this aspect, the robot system can guide the operator about the distance to the limit of the operating range.

In the robot system according to one aspect of the present disclosure, the system controller may further include a notifying range setting module configured to set the notifying range, a repulsive force setting module configured to set the repulsive force, when the repulsive force setting module determines that the target position of the working end of the slave operating command is located in the notifying range, a converting module configured to calculate a target velocity vector based on a resultant force of the operating force, the reaction force, and the repulsive force, a slave operating command generating module configured to generate the slave operating command based on the target velocity vector, and a master operating command generating module configured to generate the master operating command based on the target velocity vector.

According to this aspect, in the robot system of a bilateral control system, the robot system can appropriately notify the operator about the approaching to the limit of the operating range.

A method of controlling a robot system according to one aspect of the present disclosure is a method of controlling a robot system provided with a slave arm and a master arm. The method includes the step of outputting a slave operating command for defining a target position of a working end of the slave arm to a slave-side controller configured to control an actuator of the slave arm based on the slave operating command, based on the content of manipulation inputted into a manipulation end of the master arm. The method includes the step of, when the command generated corresponding to the content of manipulation is a command corresponding to a limit equivalent range corresponding to a limit of operation of at least one of the slave arm and the master arm, performing processing for giving perception to an operator who inputs the content of manipulation into the manipulation end. According to this aspect, the similar effect to the robot system according to one aspect of the present disclosure can be obtained.

The method of controlling the robot system according to one aspect of the present disclosure may further include the steps of receiving a detected result of a direction and a magnitude of a reaction force acting on the working end or a workpiece held by the working end, receiving a detected result of a direction and a magnitude of an operating force applied by the operator to the manipulation end, as the content of manipulation, determining the target position of the working end based on the detected operating force and reaction force, determining a target position of the manipulation end based on the detected operating force and reaction force, and outputting a master operating command for defining the target position of the manipulation end to a master-side controller configured to control an actuator of the master arm based on the master operating command. When determined that the magnitude of the operating force is not included in a range exceeding a first threshold as the limit equivalent range, the target position of the manipulation end may be determined as a position corresponding to the position of the working end. When determined that the magnitude of the operating force is included in a range exceeding the first threshold, the target position of the manipulation end may be determined as a position moved in the direction of the operating force from a position corresponding to the position of the working end.

In the method of controlling the robot system according to one aspect of the present disclosure, the master operating command for increasing a change in a moving velocity of the manipulation end as the operating force increases may be generated.

The method of controlling the robot system according to one aspect of the present disclosure may further include the steps of setting an operating mode to one of a plurality of operating modes including a normal operating mode and an informing operating mode, generating the slave operating command based on the operating force and the reaction force, generating a first temporary master operating command for moving the manipulation end in a moving direction corresponding to a moving direction of the working end of the slave operating command based on the operating force and the reaction force, generating a second temporary master operating command based on the operating force, and setting the first temporary master operating command to the master operating command in the normal operating mode, and setting the second temporary master operating command to the master operating command in the informing operating mode. The method may further include, when determined that the magnitude of the operating force is included in the range exceeding the first threshold, setting the operating mode to the informing operating mode.

The method of controlling the robot system according to one aspect of the present disclosure may further include the steps of setting an operating mode to one of the plurality of operating modes including the normal operating mode, the informing operating mode, and a resuming operating mode, generating a third temporary master operating command for moving the manipulation end toward the target position of the manipulation end defined by the first temporary master operating command, setting the third temporary master operating command to the master operating command in the resuming operating mode, and when determined that the magnitude of the operating force is included in a range of a given second threshold or below in a state where the operating mode is set to the informing operating mode, setting the operating mode to the resuming operating mode.

The method of controlling the robot system according to one aspect of the present disclosure may further include the step of, when determined that the manipulation end is located at the target position of the first temporary master operating command in a state where the operating mode is set to the resuming operating mode, setting the operating mode to the normal operating mode.

The method of controlling the robot system according to one aspect of the present disclosure may further include the steps of calculating a target velocity vector based on the operating force and the reaction force, calculating a temporary target velocity vector based on the operating force, generating the slave operating command based on the target velocity vector, generating the first temporary master operating command based on the target velocity vector, and generating the second temporary master operating command based on the temporary target velocity vector.

The method of controlling the robot system according to one aspect of the present disclosure may further include the step of receiving a detected result of a direction and a magnitude of an operating force applied by the operator to the manipulation end as the content of manipulation. When determined that the magnitude of the detected operating force is included in a range exceeding a third threshold as the limit equivalent range, a command for performing a notification using sense information perceivable by the operator's perception may be outputted.

In the method of controlling the robot system according to one aspect of the present disclosure, a command for performing a notification such that an intensity of the sense information becomes stronger as the operating force becomes larger, may be outputted.

The method of controlling the robot system according to one aspect of the present disclosure may further include the step of setting a notifying range spreading from a limit of a given operating range to the operating range side as the limit equivalent range. When determined that the target position of the working end of the slave operating command is located in the notifying range, a command for performing a notification using sense information perceivable by the operator's perception may be outputted.

In the method of controlling the robot system according to one aspect of the present disclosure, a command for performing a notification such that an intensity of the sense information becomes stronger as a distance between the target position of the working end of the slave operating command and the limit of the operating range becomes smaller, may be outputted.

The method of controlling the robot system according to one aspect of the present disclosure may further include the step of receiving a detected result of a direction and a magnitude of a reaction force acting on the working end or a workpiece held by the working end, receiving a detected result of a direction and a magnitude of an operating force applied by the operator to the manipulation end, as the content of manipulation, determining the target position of the working end based on the detected operating force and reaction force, determining a target position of the manipulation end based on the detected operating force and reaction force, outputting a master operating command for defining the target position of the manipulation end to a master-side controller configured to control an actuator of the master arm based on the master operating command, and setting a notifying range spreading from a limit of a given operating range to the operating range side as the limit equivalent range. The target position of the working end is determined based on a resultant force of the operating force and the reaction force detected at every given control period. When determined that the target position of the working end is located in the notifying range, a repulsive force acting on the working end in a direction separating from the limit of the operating range may be set. A next target position of the manipulation end may be determined based on a resultant force of the operating force, the reaction force, and the repulsive force. The master operating command for causing the actuator of the master arm to locate the manipulation end at the next target position may be outputted in a subsequent control period.

In the method of controlling the robot system according to one aspect of the present disclosure, when determined that the target position of the working end of the slave operating command is located in the notifying range, a repulsive force acting on the working end in a direction separating from the limit of the operating range may be set, and the master operating command may be generated based on a resultant force of the operating force, the reaction force, and the repulsive force in a subsequent control period.

In the method of controlling the robot system according to one aspect of the present disclosure, the repulsive force may be set so that a magnitude of the repulsive force becomes larger as a distance between the target position of the working end of the slave operating command and the limit of the operating range becomes smaller.

The method of controlling the robot system according to one aspect of the present disclosure may further include the steps of setting the notifying range, setting the repulsive force, when determined that the target position of the working end of the slave operating command is located in the notifying range, calculating a target velocity vector based on a resultant force of the operating force, the reaction force, and the repulsive force, generating the slave operating command based on the target velocity vector, and generating the master operating command based on the target velocity vector.

Hereinafter, embodiments will be described with reference to the drawings. Note that the present disclosure is not limited by the embodiments. Moreover, below, throughout the drawings, the same reference characters are assigned to the same or corresponding elements to omit redundant description.

Embodiment 1

Figure 2:
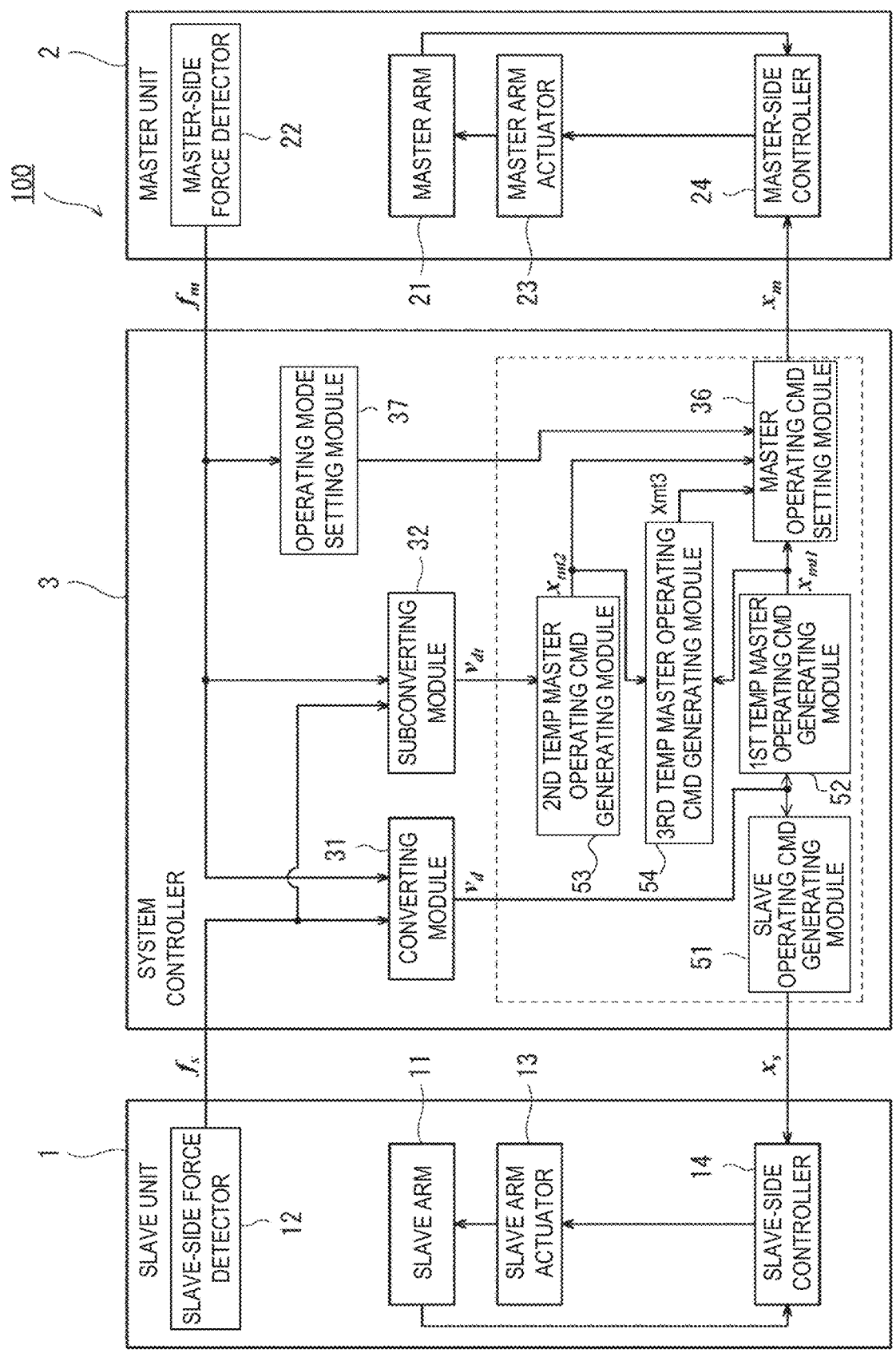
FIG. 2 is a block diagram schematically illustrating one example of a configuration of a control system of the robot system of FIG. 1.

FIG. 1 is a view schematically illustrating one example of a configuration of a robot system 100 according to Embodiment 1. FIG. 2 is a block diagram schematically illustrating one example of a configuration of a control system of the robot system 100.

As illustrated in FIGS. 1 and 2, the robot system 100 is a system including a master-slave robot which operates a slave arm 11 so that the slave arm 11 follows the motion of a master arm 21. In the robot system 100, when an operator P who is located at a position distant from a workspace of the slave arm 11 (outside of the workspace) moves the master arm 21 to input an operating command into the robot system 100, the slave arm 11 performs operation corresponding to the operating command to perform a specific work, such as an assembly of component(s).

Further, the robot system 100 is a bilateral-control robot system, in which a controller is configured to control the slave arm 11 and is further configured to control the operation of the master arm 21 while synchronizing the operation of the master arm 21 to the operation of the slave arm 11 so as to present a force acting on the slave arm 11 to the operator P through the master arm 21. The robot system 100 is provided with a slave unit 1 including the slave arm 11, a master unit 2 including the master arm 21, and a system controller 3.

[Example Configuration of Slave Unit]

As illustrated in FIGS. 1 and 2, the slave unit 1 is an industrial robot, for example. The slave unit 1 includes a base 10, the slave arm 11, a slave-side force detector 12, a slave arm actuator 13, and a slave-side controller 14. The slave arm 11 is a vertical articulated robotic arm, for example.

That is, the slave arm 11 is provided with a plurality of links connected sequentially in a direction from a base-end part to a tip-end part, and one or more joints which rotatably connects one of adjacent links to the other link. A tip-end part of the slave arm 11 is a working end 11a, and a hand (also referred to as an "end effector") 16 is provided to the working end 11a. The base 10 is fixed to a floor, for example, and supports the slave arm 11. The slave arm 11 has 6 degrees of freedom, for example, and can make the working end 11a take an arbitrary posture at an arbitrary position within an operating range inside a three-dimensional space.

For example, the hand 16 can perform a holding operation in which it holds the workpiece W and a releasing operation in which it releases or cancels the hold of the workpiece W, and perform the assembly of component(s). The hand 16 includes a hand actuator (not illustrated) for performing the holding operation and the releasing operation. Note that the structure of the hand 16 may be a structure according to the purpose of the work so that it is able to perform welding or painting.

The slave-side force detector 12 is a sensor which detects magnitudes of forces acting in three axial directions which intersect perpendicularly to each other, and moments of the forces acting about the three axes, and is disposed at the working end 11a of the slave arm 11. The slave-side force detector 12 is comprised a 6-axis force sensor capable of detecting components of the forces which act in the three axial directions which intersect perpendicularly to each other, and act about the axes. Thus, when the workpiece W held by the working end 11a of the slave arm 11 contacts an object T to which the workpiece W is assembled, the slave-side force detector 12 detects the direction and the magnitude of a reaction force fs which acts on the working end 11a or the workpiece W held by the working end 11a. The detected reaction force fs is outputted to the system controller 3.

The slave arm actuator 13 drives the slave arm 11. That is, the slave arm actuator 13 includes an actuator provided to each joint of the slave arm 11, and when it operates each joint by the drive of the actuator, a tip-end part (working end 11a) of the slave arm 11 and the hand 16 are moved with respect to a base-end part within the given operating range. In this embodiment, for example, each joint of the slave arm 11 is a rotary joint, and the actuator is a servomotor provided with a speed reducer.

The slave-side controller 14 controls the slave arm actuator 13 based on a slave operating command xs which is a positional command for defining a target position of the working end 11a to operate the slave arm 11. The slave operating command xs is a positional command in a slave coordinate system. The slave-side controller 14 calculates a rotation angle of the output shaft of the servomotor of each joint based on the slave operating command xs, controls current supplied to the servomotor of each joint of the slave arm 11 to control operation of the servomotor so that it changes the posture of the slave arm 11 and locates the working end 11a at the target position. The control of the posture of the slave arm 11 is performed by a feedback control based on a joint angle outputted from an encoder (not illustrated) provided to the slave arm 11.

[Example Configuration of Master Unit]

As illustrated in FIGS. 1 and 2, the master unit 2 is disposed outside the workspace and remotely controls operation of the slave arm 11. The master unit 2 includes the master arm 21, a master-side force detector 22, a master arm actuator 23, and a master-side controller 24.

The master arm 21 is a device for the operator P contacting and operating to input an operating command to the slave arm 11 from the operator P. For example, the master arm 21 has 6 degrees of freedom, and can make a manipulation end 21a take an arbitrary posture at an arbitrary position within an operating range in a three-dimensional space. The part which the operator P contacts and operates constitutes the manipulation end 21a, and the operator P applies a force to the manipulation end 21a to input the operating command to the slave arm 11.

The master-side force detector 22 is a sensor which detects the magnitudes of the forces acting in the three axial directions which intersect perpendicularly to each other, and the moments of the forces which act about the three axes, and is disposed at the manipulation end 21a of the master arm 21. The master-side force detector 22 is comprised of a 6-axis force sensor capable of detecting components of the forces which act in the three axial directions which intersect perpendicularly to each other, and act about the axes. Thus, the master-side force detector 22 detects the manipulation input of the operator P into the manipulation end 21a, and detects the operating command 21a from the operator P to the slave arm 11, i.e., the direction and the magnitude of an operating force fm which the operator P applied to the manipulation end of the master arm 21. The detected operating force fm is outputted to the system controller 3.

The master arm actuator 23 drives the master arm 21. That is, the master arm actuator 23 includes an actuator provided to each joint of the master arm 21, and operates each joint by the drive of the actuator to move the manipulation end 21a of the master arm 21. In this embodiment, for example, the actuator is a servomotor provided with a speed reducer.

The master-side controller 24 controls the master arm actuator 23 based on a master operating command xm which is a positional command for defining a target position of the manipulation end 21a to operate the master arm 21. The master operating command xm is a positional command in a master coordinate system. The master coordinate system corresponds to the slave coordinate system, and therefore, based on one of position command values, the position command value of the other can be calculated by using a coordinate conversion. The master-side controller 24 calculates a rotation angle of the output shaft of the servomotor of each joint of the master arm 21 based on the master operating command xm, controls current supplied to the servomotor of each joint of the master arm 21 to control operation of the servomotor of each joint so that it changes the posture of the master arm 21, and therefore, locates the manipulation end 21a at the target position. The control of the posture of the master arm 21 is performed by a feedback control based on the joint angle outputted from an encoder (not illustrated) provided to the master arm 21.

[Example Configuration of System Controller]

The system controller 3 controls the slave unit 1 and the master unit 2 by a parallel bilateral control system. That is, the system controller 3 generates the slave operating command xs which is a positional command and the master operating command xm which is the positional command based on the operating force fm detected by the master-side force detector 22 and the reaction force fs detected by the slave-side force detector 12.

The system controller 3 includes a converting module 31, a subconverting module 32, a slave operating command generating module 51, a first temporary master operating command generating module 52, a second temporary master operating command generating module 53, a third temporary master operating command generating module 54, a master operating command setting module 36, and an operating mode setting module 37. The converting module 31, the subconverting module 32, the slave operating command generating module 51, the first temporary master operating command generating module 52, the second temporary master operating command generating module 53, the third temporary master operating command generating module 54, the master operating command setting module 36, and the operating mode setting module 37 are functional blocks implemented by a processor (not illustrated) executing a given control program. Note that functions of the slave-side controller 14 and the master-side controller 24 are implemented by processor(s) (not illustrated) executing given control program(s).

The above-described processor related to the slave-side controller 14, the master-side controller 24, and the system controller 3 is comprised of a processor such as, a microcontroller, a CPU (Central Processing Unit), an ASIC (Application Specific Integrated Circuit), or a PLD (Programmable Logic Device) such as an FPGA (Field Programmable Gate Array). The processor may be comprised of a sole controller which carries out a centralized control, or may be comprised of a plurality of controllers which collaboratively carry out a distributed control. Note that some or all of the function of the processor may be implemented by a computer system comprised of a processor such as a CPU, a nonvolatile memory such as a RAM (Random Access Memory), and a volatile memory such as a ROM (Read-Only Memory), or may be implemented by dedicated hardware circuitry for an electronic circuit or an integrated circuit, or may be implemented by a combination of the computer system and the hardware circuitry.

Moreover, the system controller 3 is provided with a storage device (not illustrated) which stores various programs and data. For example, the storage device includes a semiconductor memory, a hard disk drive, and an SSD (Solid State Drive), which are a volatile memory and a nonvolatile memory. Moreover, the system controller 3 may be comprised of a sole controller including the slave-side controller 14 and the master-side controller 24, or may be comprised of a plurality of controllers which collaboratively carry out a distributed control.

The converting module 31 calculates a target velocity vector vd based on a resultant force of the operating force fm detected by the master-side force detector 22 and the reaction force fs detected by the slave-side force detector 12. The target velocity vector vd is used for calculating the moving directions and the magnitudes of the movement of the working end 11a and the manipulation end 21a, as will be described later. In more detail, the converting module 31 calculates the target velocity vector vd defining the moving directions and moving velocities of the working end 11a and the manipulation end 21a based on a difference between the operating force fm and the reaction force fs by using the following Formula (1).

$$m \times \dot{v}_d + c_v \times v_d = f_m - f_s \quad (1)$$

Note that, "m" is a given mass value, and "$c_v$" is a given coefficient of viscosity.

As illustrated in Formula (1), by calculating the difference between the operating force fm and the reaction force fs, the converting module 31 associates the operating force fm with the reaction force fs, and treats the reaction force fs as a reaction force against the operating force fm. Then, the target velocity vector vd is a value according to the difference between the operating force fm and the reaction force fs, and when the reaction force fs is not zero due to the contact with the object T, the target velocity vector vd normally becomes a vector which goes in a direction different from the direction of the operating force fm.

The subconverting module 32 calculates a temporary target velocity vector vdt used for calculating the moving direction and the magnitude of the movement of the manipulation end 21a based on the operating force fm detected by the master-side force detector 22. In more detail, the subconverting module 32 calculates the temporary target velocity vector vdt defining the moving direction and the moving velocity of the manipulation end 21a based on the operating force fm by using the following Formula (2).

$$m \times \dot{v}_{dt} + c_v \times v_{dt} = f_m \quad (2)$$

As illustrated in Formula (2), the temporary target velocity vector vdt is a value according to the operating force fm, and the temporary target velocity vector vdt becomes a vector which goes substantially in the same direction as the operating force fm. Moreover, the subconverting module 32 may multiply the reaction force fs by a given coefficient and set a temporary reaction force smaller than the reaction force fs, and may calculate the temporary target velocity vector vdt based on the temporary reaction force and the operating force fm.

The slave operating command generating module 51 generates the slave operating command xs based on the target velocity vector vd so that the working end 11a is moved at a speed according to the value of the target velocity vector vd. The slave operating command xs is a positional command for defining the target position of the working end 11a, as described above. The target position is normally set in the direction different from the direction of the operating force fm, when the reaction force fs is not substantially zero, as described regarding the target velocity vector vd. The slave operating command xs is outputted to the slave-side controller 14, and the slave-side controller 14 controls the slave arm actuator 13 based on the slave operating command xs so that the working end 11a of the slave arm 11 is moved synchronously to follow the motion of the manipulation end 21a of the master arm 21.

The first temporary master operating command generating module 52 generates a first temporary master operating command xmt1 based on the target velocity vector vd so that the manipulation end 21a is moved at a speed according to the value of the target velocity vector vd. The first temporary master operating command xmt1 is an operating command for moving the manipulation end 21a in a moving direction corresponding to the moving direction of the working end 11a of the slave operating command xs, and is a positional command for defining the target position of the manipulation end 21a. Similarly to the slave operating command xs, the target position is normally set in a direction different from the direction of the operating force fm, when the reaction force fs is not substantially zero.

In this embodiment, in order to make the first temporary master operating command xmt1 as the operating command for moving the manipulation end 21a in the moving direction corresponding to the moving direction of the working end 11a of the slave operating command xs, similar to the slave operating command xs, the first temporary master operating command xmt1 is generated based on the target velocity vector vd. Then, when seen from the operator P, the first temporary master operating command xmt1 is generated so that the moving direction of the working end 11a of the slave operating command xs becomes the same direction as the moving direction of the manipulation end 21a of the first temporary master operating command xmt1 (in agreement with each other).

The second temporary master operating command generating module 53 generates the second temporary master operating command xmt2 based on the temporary target velocity vector vdt so that the manipulation end 21a is moved at a speed according to the value of the temporary target velocity vector vdt. The second temporary master operating command xmt2 is a positional command for defining the target position of the manipulation end 21a. The target position is set in the same direction as the operating force fm, as described regarding the temporary target velocity vector vdt.

The third temporary master operating command generating module 54 generates the third temporary master operating command xmt3 for moving the manipulation end 21a toward the target position of the manipulation end 21a defined by the first temporary master operating command xmt1. The third temporary master operating command xmt3 is a positional command for defining the target position of the manipulation end 21a. The target position is set in the same direction as the operating force fm, as described regarding the temporary target velocity vector vdt.

The master operating command setting module 36 sets the first temporary master operating command xmt1 to the master operating command xm in the normal operating mode, sets the second temporary master operating command xmt2 to the master operating command xm in an informing operating mode, and sets the third temporary master operating command xmt3 to the master operating command xm in a resuming operating mode. The master operating command xm is outputted to the master-side controller 24.

The operating mode setting module 37 sets the mode to one of a plurality of operating modes including a normal operating mode, the informing operating mode, and the resuming operating mode.

Therefore, the master operating command setting module 36 sets the first temporary master operating command xmt1 to the master operating command xm in the normal operating mode. The master-side controller 24 controls the master arm actuator 23 based on the first temporary master operating command xmt1 to operate the manipulation end 21a of the master arm 21 so that the manipulation end 21a resists the operating force fm. Thus, the force acting on the working end 11a of the slave arm 11 is presented to the operator P through the manipulation end 21a. Therefore, the operator P can perform the work while recognizing the inner force sense when the working end 11a contacts the environment.

Moreover, the master operating command setting module 36 sets the second temporary master operating command xmt2 to the master operating command xm in the informing operating mode. The master-side controller 24 controls the master arm actuator 23 based on the second temporary master operating command xmt2 to move the manipulation end 21a in the direction of the operating force fm applied by the operator P.

Further, the master operating command setting module 36 sets the third temporary master operating command xmt3 to the master operating command xm in the resuming operating mode. The master-side controller 24 controls the master arm actuator 23 based on the third temporary master operating command xmt3 to move the manipulation end 21a so that the correlation with the working end 11a is resumed.

Note that, the slave operating command generating module 51, the first temporary master operating command generating module 52, the second temporary master operating command generating module 53, and the third temporary master operating command generating module 54 generate the operating command regardless of in which operating mode the operation is currently set.

[Example Operation]

Figure 3:
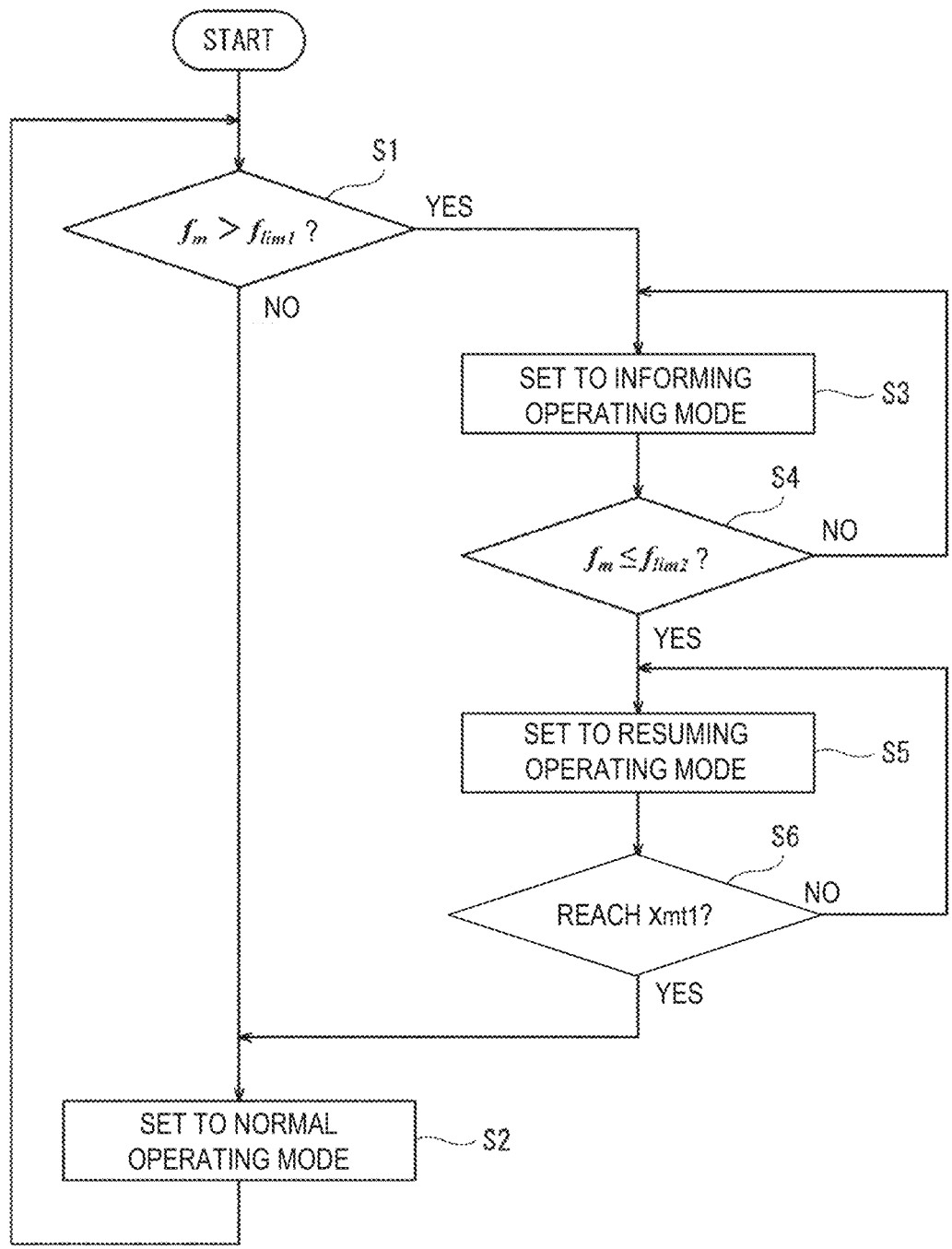
FIG. 3 is a flowchart illustrating one example of operation of the robot system of FIG. 1.

Next, one example of operation of the robot system 100 is described. FIG. 3 is a flowchart illustrating one example of operation of the robot system 100. As illustrated in FIG. 1, in this example operation, the operator P uses the robot system 100 to perform a work in which the workpiece W is assembled to the object T by fitting the workpiece W which is formed in a cylindrical shape and has a through-hole Wa onto the object T which is a cylindrical pin extending in the up-and-down direction and is formed fittable into the through-hole Wa. The workpiece W is gripped by the hand 16 of the slave arm 11, and the object T is located, for example, over a production line.

First, the operating mode setting module 37 determines whether the magnitude of the operating force fm is included in a range exceeding a given first threshold flim1 (Step S1). The range exceeding the first threshold flim1 is one example of a limit equivalent range. The first threshold flim1 is a value set in advance based on a load permitted by the master arm 21, and is a value set based on, for example, the maximum load which is detectable by the master-side force detector 22, the load at which the master-side force detector 22 is not damaged, the load at which the joint of the master arm 21 is not damaged, and the load at which the link of the master arm 21 is not bent. In an initial state in which the operating force fm is not applied to the master arm 21, since the operating force fm is zero, the operating mode setting module 37 determines that the magnitude of the operating force fm is not included in the range exceeding the first threshold flim1, i.e., it does not exceed the first threshold flim1 (NO at Step S1), and sets the operating mode to the normal operating mode (Step S2).

Then, in this initial state, if the slave arm 11 does not contact the environment, such as the object T, the reaction force fs becomes zero and the difference between the operating force fm and the reaction force fs also becomes zero. Therefore, the target velocity vector vd calculated by the converting module 31 becomes a zero vector, and the position command value according to the slave operating command xs generated by the slave operating command generating module 51 based on the target velocity vector vd does not change. Therefore, the slave-side controller 14 maintains the current posture of the slave arm 11. Moreover, the position command value according to the first temporary master operating command xmt1 does not change, and in the normal operating mode, the master-side controller 24 maintains the current posture of the master arm 21 based on the first temporary master operating command xmt1. Then, the operating mode setting module 37 again performs a determination according to Step S1.

Next, when the operator P applies the operating force fm in a direction in which the workpiece W is brought closer to the object T, i.e., applies the operating force fm to the manipulation end 21a of the master arm 21 downwardly, the converting module 31 calculates a downward target velocity vector vd having the magnitude according to the operating force fm by using Formula (1). Note that, in the state where the workpiece W does not contact the object T, the reaction force fs is zero.

Next, the slave operating command generating module 51 generates the slave operating command xs based on the target velocity vector vd, and sets the target position of the working end 11a of the slave arm 11 below the current position. The slave-side controller 14 changes the posture of the slave arm 11 based on the slave operating command xs so that the working end 11a moves downwardly.

Moreover, the first temporary master operating command generating module 52 generates the first temporary master operating command xmt1 based on the target velocity vector vd, and updates the target position of the manipulation end 21a of the master arm 21 to the position below the current position. When the magnitude of the operating force fm is not included in the range exceeding the first threshold flim1, the state where the operating mode is set to the normal operating mode is maintained, and the master-side controller 24 changes the posture of the master arm 21 based on the first temporary master operating command xmt1 so that the manipulation end 21a moves downwardly toward the target position.

Thus, when the magnitude of the operating force fm is not included in the range exceeding the given first threshold flim1, the working end 11a of the slave arm 11 and the manipulation end 21a of the master arm 21 move in the same direction simultaneously. Therefore, when the operator P moves the manipulation end 21a of the master arm 21, the operator P can acquire the sensation as if the working end 11a of the slave arm 11 operates so as to follow the motion of the manipulation end 21a of the master arm 21.

Then, when the working end 11a of the slave arm 11 moves downwardly to cause the workpiece W to contact an upper end of the object T and push the workpiece W against the object T, the reaction force fs according to the magnitude of the pushing force is detected by the slave-side force detector 12. Then, from this state, even if the operator P applies the strong downward operating force fm against the manipulation end 21a, the reaction force fs increases in proportion to the operating force fm, the difference between the operating force fm and the reaction force fs becomes substantially zero, and the target velocity vector vd calculated by the converting module 31 becomes the zero vector.

At this time, the slave operating command generating module 51 generates the slave operating command xs based on the target velocity vector vd which is the zero vector regardless of the set operating mode, and sets the target position of the working end 11a of the slave arm 11 to substantially the same position as the current position. The slave-side controller 14 maintains the current posture of the slave arm 11 based on the slave operating command xs.

Moreover, the first temporary master operating command generating module 52 also generates the first temporary master operating command xmt1 based on the target velocity vector vd which is the zero vector, and sets the target position of the manipulation end 21a of the master arm 21 to substantially the same position as the current position. Then, in the normal operating mode, the master-side controller 24 maintains the current posture of the master arm 21 based on the first temporary master operating command xmt1, and operates the manipulation end 21a of the master arm 21 so that the manipulation end 21a resists the operating force fm. Therefore, the reaction force fs which acts on the working end 11a of the slave arm 11 can be presented to the operator P through the manipulation end 21a. Therefore, the operator P can perform the work while recognizing the reaction force fs through the inner force sense of the operator P, when the working end 11a contacts the environment. This work is, for example, to move the workpiece W in a direction perpendicular to the reaction force while pushing the workpiece W against the object T to explore a position at which the through-hole Wa fits onto the object T. By recognizing the direction of the reaction force fs, the operator P can recognize the direction of exploring the position at which the object T fits, i.e., the direction perpendicular to the reaction force fs, and can perform the work efficiently.

At this time, by the operation of the operator P, such as forcibly applying the downward operating force fm to the manipulation end 21a of the master arm 21, if the operating mode setting module 37 determines that the magnitude of the operating force fm is included in the range exceeding the first threshold flim1, i.e., the magnitude exceeds the first threshold flim1 (YES at Step S1), it sets the operating mode to the informing operating mode (Step S3). Therefore, the master operating command setting module 36 sets the second temporary master operating command xmt2 to the master operating command xm, and generates the master operating command xm for moving the manipulation end 21a in the direction of the operating force fm.

As described above, the second temporary master operating command generating module 53 generates the second temporary master operating command xmt2 based on the temporary target velocity vector vdt calculated by the sub-converting module 32. Therefore, in the state where the operating mode is set to the informing operating mode, the master-side controller 24 changes the posture of the master arm 21 so that the manipulation end 21a of the master arm 21 moves downwardly toward the target position based on the second temporary master operating command xmt2.

Moreover, as described above, the temporary target velocity vector vdt is a velocity vector having the magnitude and the direction according to the operating force fm detected by the master-side force detector 22. Therefore, in the state where the operator P applies the strong downward operating force fm against the manipulation end 21a, the temporary target velocity vector vdt becomes a downward vector with a large magnitude. Therefore, the target position of the second temporary master operating command xmt2 becomes a largely distant position below the current position. Therefore, the master-side controller 24 does not move the manipulation end 21a until the magnitude of the operating force fm exceeds the first threshold flim1, and then, when the magnitude of the operating force fm is included in the range exceeding the first threshold flim1, it suddenly moves the manipulation end 21a downwardly. That is, the operation of the manipulation end 21a changes suddenly. Therefore, the operator P can be informed about the magnitude of the operating force fm exceeding the first threshold flim1. Moreover, when the manipulation end 21a moves in the direction in which the operator P applied the force, the load on the master arm 21 and the master-side force detector 22 can be reduced, and the damages to the master arm 21 and the master-side force detector 22 can be prevented.

Further, since the manipulation end 21a suddenly moves in the direction in which the operator P applied the force and the operation of the manipulation end 21a changes suddenly, the operator P may be surprised, and, as a result, the operator P may be guided so that he/she weakens the operating force fm.

Moreover, the master operating command xm is generated so that, as the magnitude of the operating force fm (or an excess amount of the operating force fm from the first threshold flim1) increases, the magnitude of the temporary target velocity vector vdt becomes larger, and, as a result, the change in the moving velocity of the manipulation end 21a increases. Therefore, the operator P can be guided about how much the operating force fm is to be weakened. Moreover, the operator P can be surprised as much as the magnitude of the excessive operating force fm. As a result, the operator P can be guided so as to appropriately weaken the operating force fm. Moreover, the manipulation end 21a moves more quickly in the direction in which the operator P applied the force as the magnitude of the operating force fm increases. Therefore, the load on the master arm 21 and the master-side force detector 22 can be reduced more appropriately, and the damages to the master arm 21 and the master-side force detector 22 can be prevented more appropriately. Further, since the operating mode can be changed automatically from the normal operating mode to the informing operating mode, an emergency stop for protecting the robot system 100 can be avoided.

Note that, in this embodiment, the master operating command xm is generated so that the moving velocity of the manipulation end 21a is increased as the magnitude of the operating force fm increases. However, the present disclosure is not limited to this configuration. Alternatively, the master operating command xm may be generated so that the moving velocity of the manipulation end 21a is increased as an amount of change in the magnitude of the operating force per unit time increases.

Note that the slave-side controller 14 controls the slave arm 11 based on the operating force fm and the reaction force fs, regardless of the set operating mode. For example, if the operator P weakens the operating force fm, the target velocity vector vd becomes an upward vector based on Formula (1), and the slave-side controller 14 controls the slave arm 11 to reduce the pushing force against the object T. Note that, when the operating mode is set to operating modes other than the normal operating mode, the slave-side controller 14 may suspend the operation of the slave arm 11.

Then, when the operating mode setting module 37 sets the informing operating mode at Step S3, it then determines whether the magnitude of the operating force fm is included in an range of a second threshold flim2 or below (Step S4). The second threshold flim2 is a value of the first threshold flim1 or below, which is set in advance.

Then, while the magnitude of the operating force fm is not included in the range of the second threshold flim2 or below, i.e., while determining that it exceeds the second threshold flim2 (NO at Step S4), the operating mode setting module 37 repeatedly determines whether the magnitude of the operating force fm is included in the range of the second threshold flim2 or below.

Then, when the operator P weakens the operating force fm and the magnitude of the operating force fm becomes the second threshold flim2 or below, the operating mode setting module 37 determines that the magnitude of the operating force fm is included in the range of the second threshold flim2 or below (YES at Step S4), and sets the operating mode to the resuming operating mode (Step S5).

As described above, the third temporary master operating command generating module 54 generates the third temporary master operating command xmt3 based on the current position of the manipulation end 21a and the first temporary master operating command xmt1 generated by the first temporary master operating command generating module 52. Therefore, in the state where the operating mode is set to the resuming operating mode, the master-side controller 24 moves the manipulation end 21a of the master arm 21 toward the target position of the first temporary master operating command xmt1 based on the third temporary master operating command xmt3.

Next, the operating mode setting module 37 determines whether the manipulation end 21a is located at the target position according to the first temporary master operating command xmt1 generated by the first temporary master operating command generating module 52, i.e., reaches the target position (Step S6). This determination is performed by determining whether the current position of the manipulation end 21a is equal to the target position of the first temporary master operating command xmt1. Then, if the operating mode setting module 37 determines that the manipulation end 21a is not located at the target position according to the first temporary master operating command xmt1 (NO at Step S6), it again performs Step S5, where it maintains the state where the operating mode is set to the resuming operating mode.

Then, if the operating mode setting module 37 determines that the manipulation end 21a is located at the target position according to the first temporary master operating command xmt1, it performs Step S2, where it sets and resumes the operating mode to the normal operating mode. Therefore, the working end 11a of the slave arm 11 and the manipulation end 21a of the master arm 21 are again configured to move in the same direction simultaneously. Moreover, the operating mode can be automatically resumed to the normal operating mode, and an interruption of the work can be avoided.

As described above, the robot system 100 sets the operating mode to the informing operating mode when the operating mode setting module 37 determines that the magnitude of the operating force fm is included in the range exceeding the first threshold flim1, and it generates the master operating command xm so that the manipulation end 21a is moved in the direction of the operating force fm. Therefore, the robot system 100 can inform the operator P that the master arm 21 is overloaded. Moreover, the robot system 100 can operate the master arm 21 so that the load slips off the master arm 21. Therefore, the damage to the master arm 21 can be prevented.

Modification 1 of Embodiment 1

Figure 4:
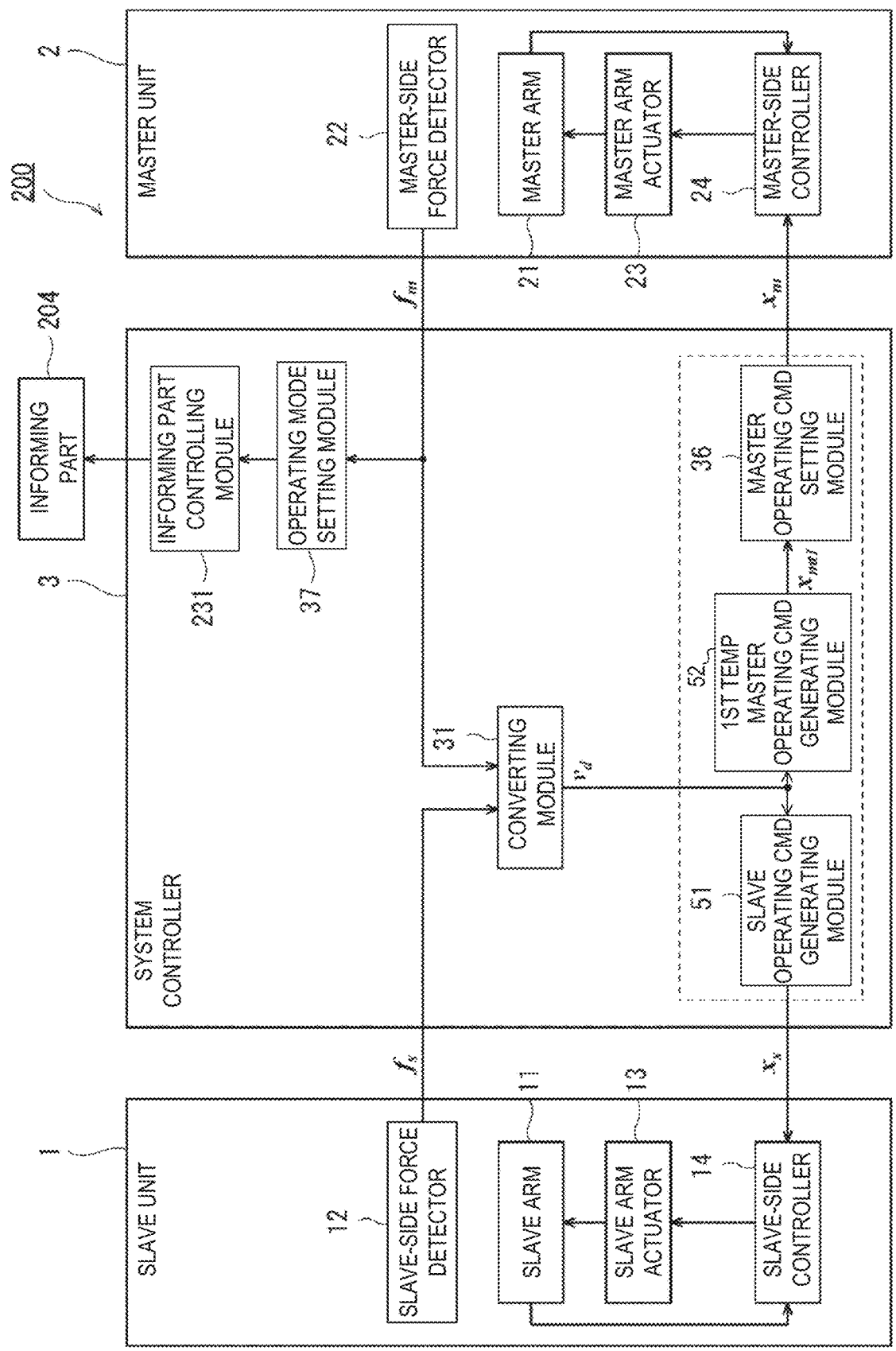
FIG. 4 is a block diagram schematically illustrating one example of a configuration of a control system of a robot system according to Modification 1 of Embodiment 1.

Below, a configuration and operation of Modification 1 of the embodiment is described focusing on the difference from Embodiment 1. FIG. 4 is a block diagram schematically illustrating one example of a configuration of a control system of a robot system 200 according to Modification 1 of Embodiment 1.

In this modification, the robot system 200 is further provided with an informing part 204 which performs a notification by using sense information perceivable by the perception of the operator P. For example, the perception of the operator P is at least any one of the senses, such as a tactile sense, an inner force sense, an acoustic sense, a sense of smell, and a visual sense. Moreover, the informing part 204 includes a vibrator, a speaker, a display, and a signaling lamp. Moreover, in this modification, the system controller 3 further includes an informing part controlling module 231. The informing part controlling module 231 is a functional block implemented by a processor (not illustrated) executing a given control program. Note that, in FIG. 4, although the subconverting module 32, the second temporary master operating command generating module 53, and the third temporary master operating command generating module 54 are not illustrated, these functional blocks may also be included.

In the informing operating mode, the informing part controlling module 231 controls the informing part 204 to perform the notification to the operator P. Therefore, it can inform the operator P that the magnitude of the operating force fm exceeds the first threshold flim1.

Moreover, the informing part controlling module 231 controls the informing part 204 so that the intensity of the sense information becomes stronger as the operating force fm increases. Controlling the informing part 204 so as to make the intensity of the sense information stronger is, for example, increasing the sound volume, changing the pitch of sound, changing the tone, increasing the vibration to the manipulation end 21a, increasing the brightness, increasing a display area of the display unit. Thus, the operator P may be surprised as much as the magnitude of the excessive operating force fm, and, as a result, the operator P may be guided so that he/she appropriately weakens the operating force fm.

Embodiment 2

A robot system 100A according to Embodiment 2 is described. Below, Embodiment 2 is described focusing on the difference from Embodiment 1 and Modification 1, and description of the same matters as Embodiment 1 and Modification 1 is suitably omitted.

Figure 5:
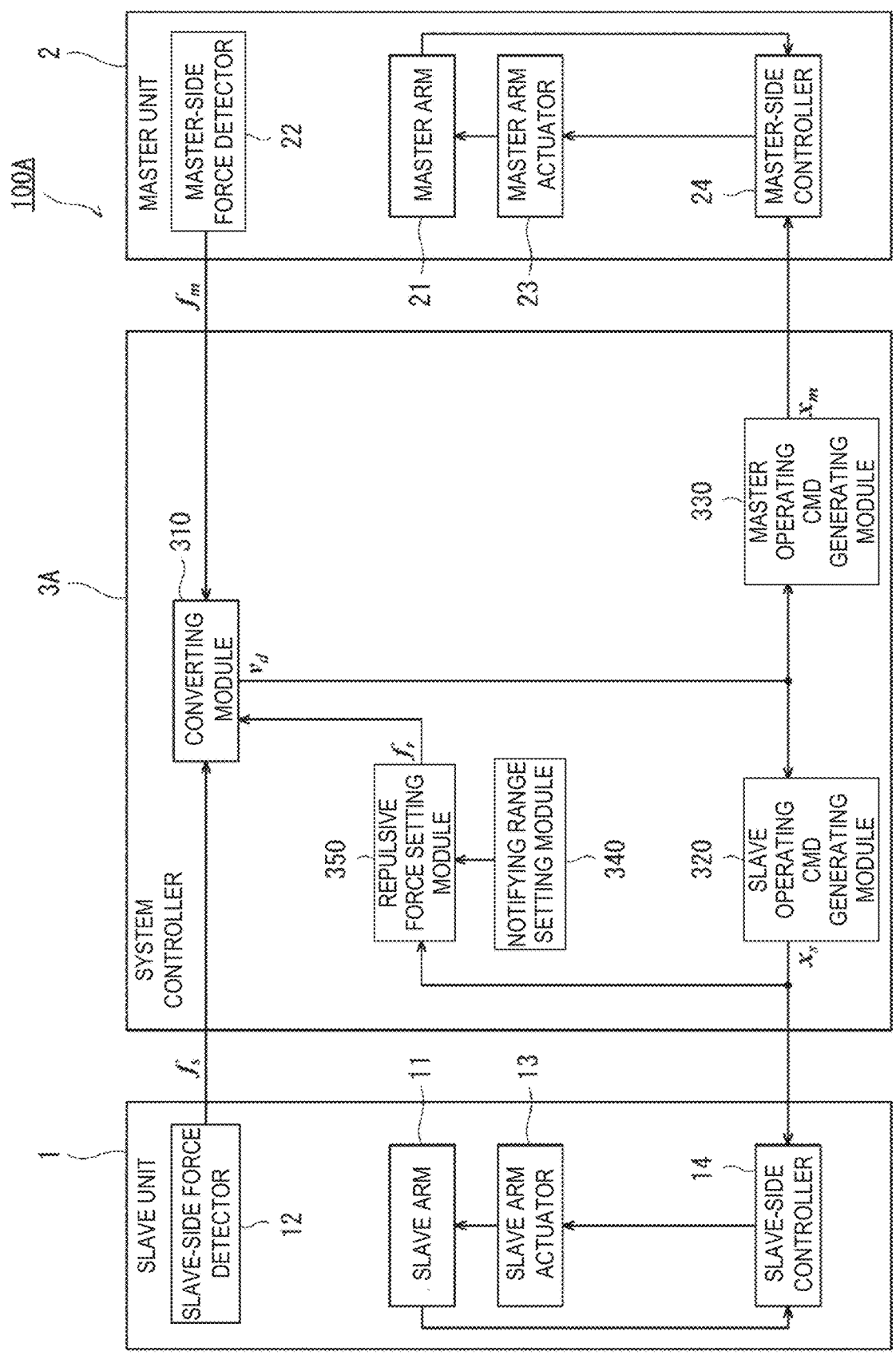
FIG. 5 is a block diagram schematically illustrating one example of a configuration of a control system of a robot system according to Embodiment 2.

FIG. 5 is a block diagram schematically illustrating one example of a configuration of a control system of the robot system 100A according to Embodiment 2. As illustrated in FIG. 5, the robot system 100A includes the slave unit 1, the master unit 2, and a system controller 3A.

The system controller 3A generates the slave operating command xs and the master operating command xm based on the operating force fm detected by the master-side force detector 22, and the reaction force fs detected by the slave-side force detector 12, at every given control period. Moreover, the system controller 3A generates each command so that the target position of the slave operating command xs and the target position of the master operating command xm have a given correlation.

The system controller 3 includes a converting module 310, a slave operating command generating module 320, a master operating command generating module 330, a notifying range setting module 340, and a repulsive force setting module 350. The converting module 310, the slave operating command generating module 320, the master operating command generating module 330, the notifying range setting module 340, and the repulsive force setting module 350 are functional blocks implemented by a processor (not illustrated) executing a given control program.

The converting module 310 calculates a target velocity vector vd based on a resultant force of the operating force fm detected by the master-side force detector 22, the reaction force fs detected by the slave-side force detector 12, and a repulsive force fr set by the repulsive force setting module 350. In more detail, the converting module 310 calculates the target velocity vector vd defining the moving directions and the moving velocities of the working end 11a and the manipulation end 21a based on a resultant force obtained by adding the repulsive force fr to a difference between the operating force fm and the reaction force fs, by using the following Formula (3).

$$m \times \dot{v}_d + c_v \times v_d = f_m - f_s + f_r \quad (3)$$

Note that, "m" is a given mass value, and "$c_v$" is a given coefficient of viscosity.

As illustrated in Formula (3), the converting module 310 associates the operating force fm with the reaction force fs by calculating the difference between the operating force fm and the reaction force fs, and treats the reaction force fs as a reaction force against the operating force fm.

The function of the slave operating command generating module 320 is the same as the function of the slave operating command generating module 51 of Embodiment 1.

The master operating command generating module 330 generates the master operating command xm based on the target velocity vector vd so that the manipulation end 21a is moved at the speed according to the value of the target velocity vector vd, and outputs it to the master-side controller 24. The master-side controller 24 controls the master arm actuator 23 based on the master operating command xm and operates the manipulation end 21a of the master arm 21 so that the manipulation end 21a resists the operating force fm to present the operator P the reaction force fs which acts on the working end 11a of the slave arm 11 and the repulsive force fr set by the repulsive force setting module 350. Therefore, the operator P can perform the work while recognizing the reaction force fs through the inner force sense of the operator P, when the working end 11a contacts the environment. Moreover, the operator P can perform the work while recognizing the repulsive force fr through the inner force sense of the operator P, when the working end 11a enters into a notifying range A3. The notifying range A3 is one example of the limit equivalent range.

Figure 6:
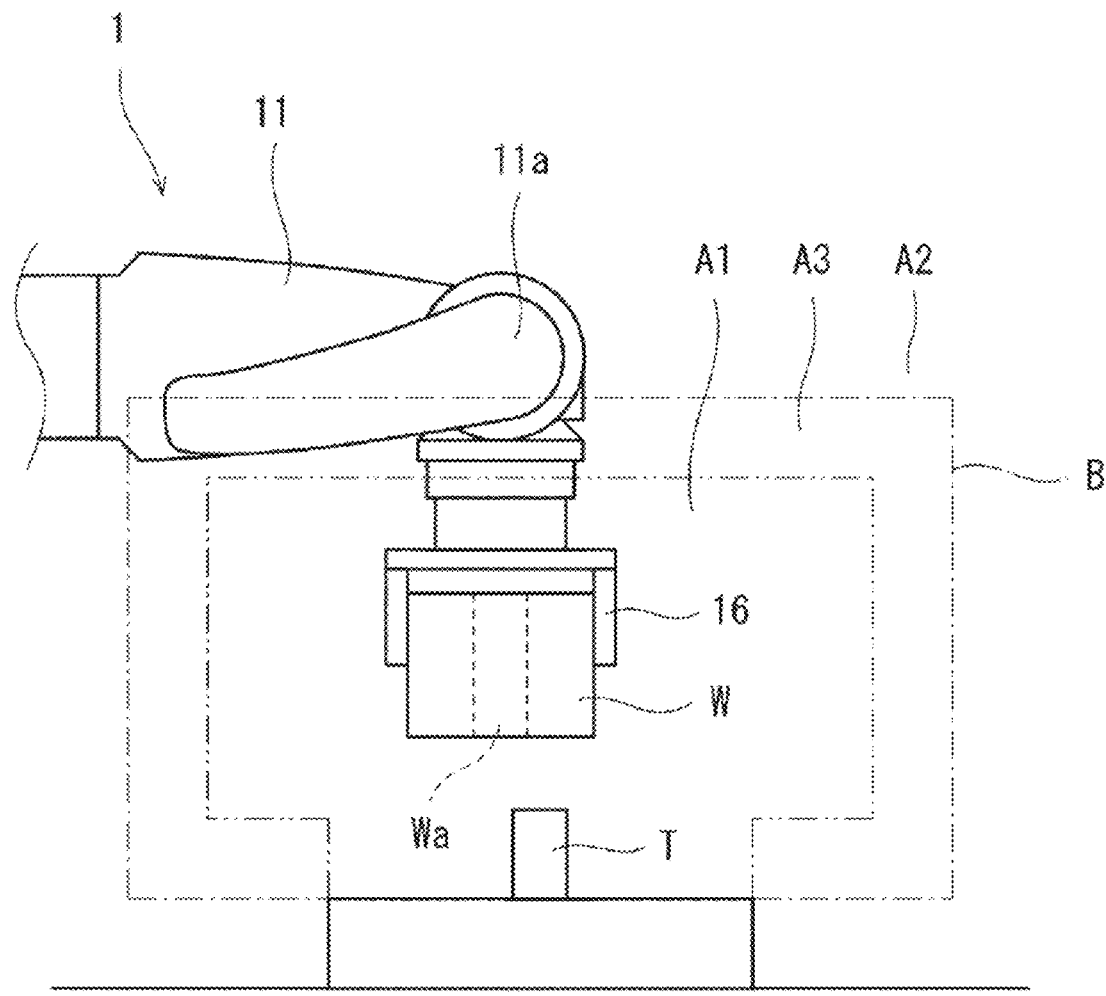
FIG. 6 is a view illustrating one example of setting of an operating range, an entering prohibited range, and a notifying range set by a notifying range setting module of the robot system according to Embodiment 2.

FIG. 6 is a view illustrating one example of setting of an operating range A1, an entering prohibited range A2, and the notifying range A3 which are set by the notifying range setting module 340 of the robot system 100A according to Embodiment 2.

As illustrated in FIG. 6, the notifying range setting module 340 sets the notifying range A3 which spreads toward the given operating range A1 from the limit of the operating range A1, i.e., a boundary B (illustrated by a one-dot chain line in FIG. 6). That is, the notifying range A3 spreads inward of the operating range A1. In detail, the notifying range setting module 340 sets the given operating range A1, the entering prohibited range A2 other than operating range A1, and the notifying range A3 which spreads toward the operating range A1 from the limit of the given operating range A1, i.e., the boundary B between the operating range A1 and the entering prohibited range A2, by a given distance. That is, the notifying range A3 is a range included in the operating range A1, and is set so as to overlap with the operating range A1. The settings of the operating range A1, the entering prohibited range A2, and the notifying range A3 are stored in advance in a memory (not illustrated). The notifying range setting module 340 sets these ranges A1-A3 by reading the settings of the ranges A1-A3 from the memory. The function of the memory is implemented by the storage device described above. The operating range A1 is set so as to exclude, for example, a space where the work is not performed, such as a space where an obstacle exists and a space distant from the object T.

As illustrated in FIG. 5, when the repulsive force setting module 350 determines that the target position of the working end 11a of the slave operating command xs is located in the notifying range A3, it sets the repulsive force fr which has a direction separating from the limit of the operating range A1 and acts on the working end 11a. In this embodiment, the repulsive force setting module 350 first calculates a distance d in the normal direction of the boundary B between the target position of the slave operating command xs and the boundary B. Then, the repulsive force setting module 350 calculates the repulsive force fr by using the following Formula (4).

$$f_r = (-kd + a)i \quad (4)$$

Note that, "k" is a given coefficient, "a" is a repulsive force which acts on the working end when the working end locates on the boundary, and "i" is a unit normal vector of the boundary B to the operating range side.

As illustrated in this Formula (4), the repulsive force setting module 350 calculates the repulsive force fr so that the magnitude of the repulsive force fr becomes larger as the distance between the target position of the working end 11a of the slave operating command xs and the limit of the operating range A1 decreases. Note that a coefficient k in Formula (4) is a value set so as to be a repulsive force fr favorable for the operator P.

Example Operation

Figure 7:
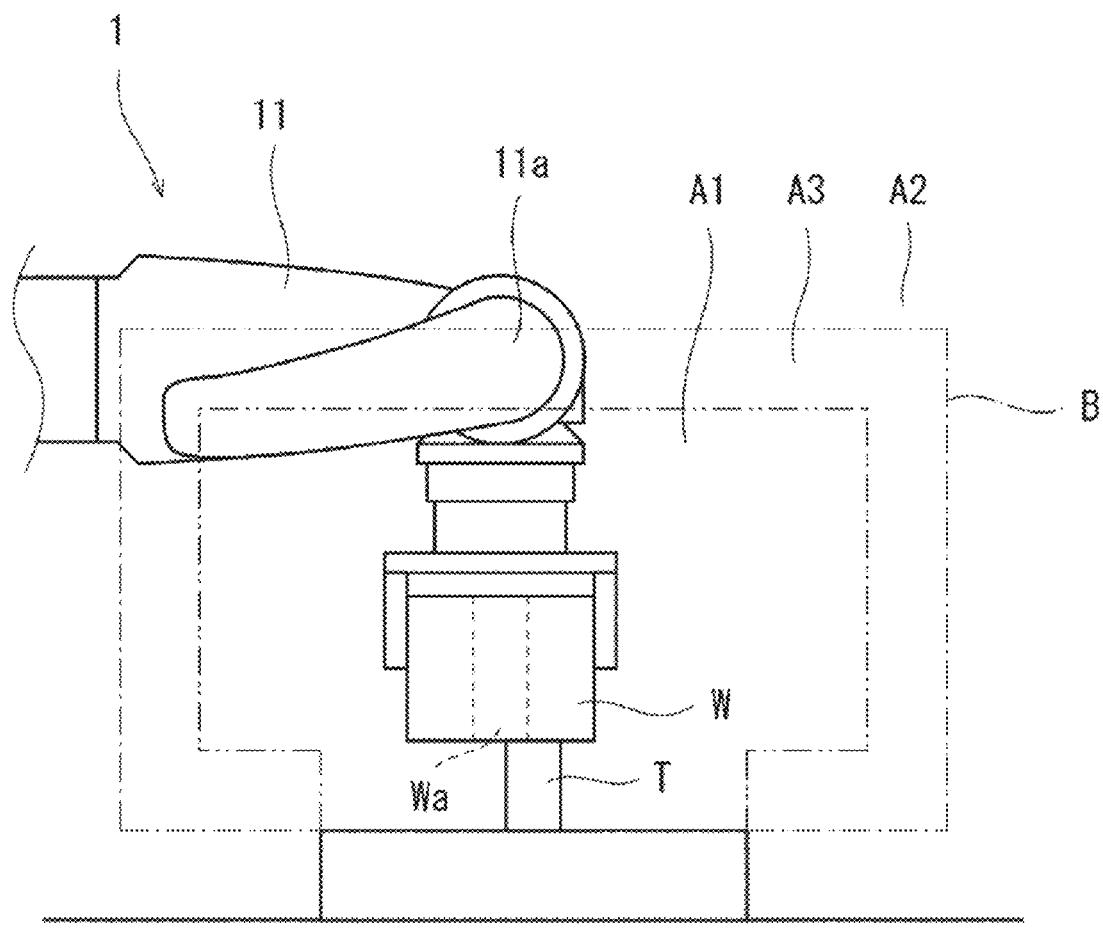
FIG. 7 is a view illustrating one example of operation of the robot system according to Embodiment 2.
Figure 8:
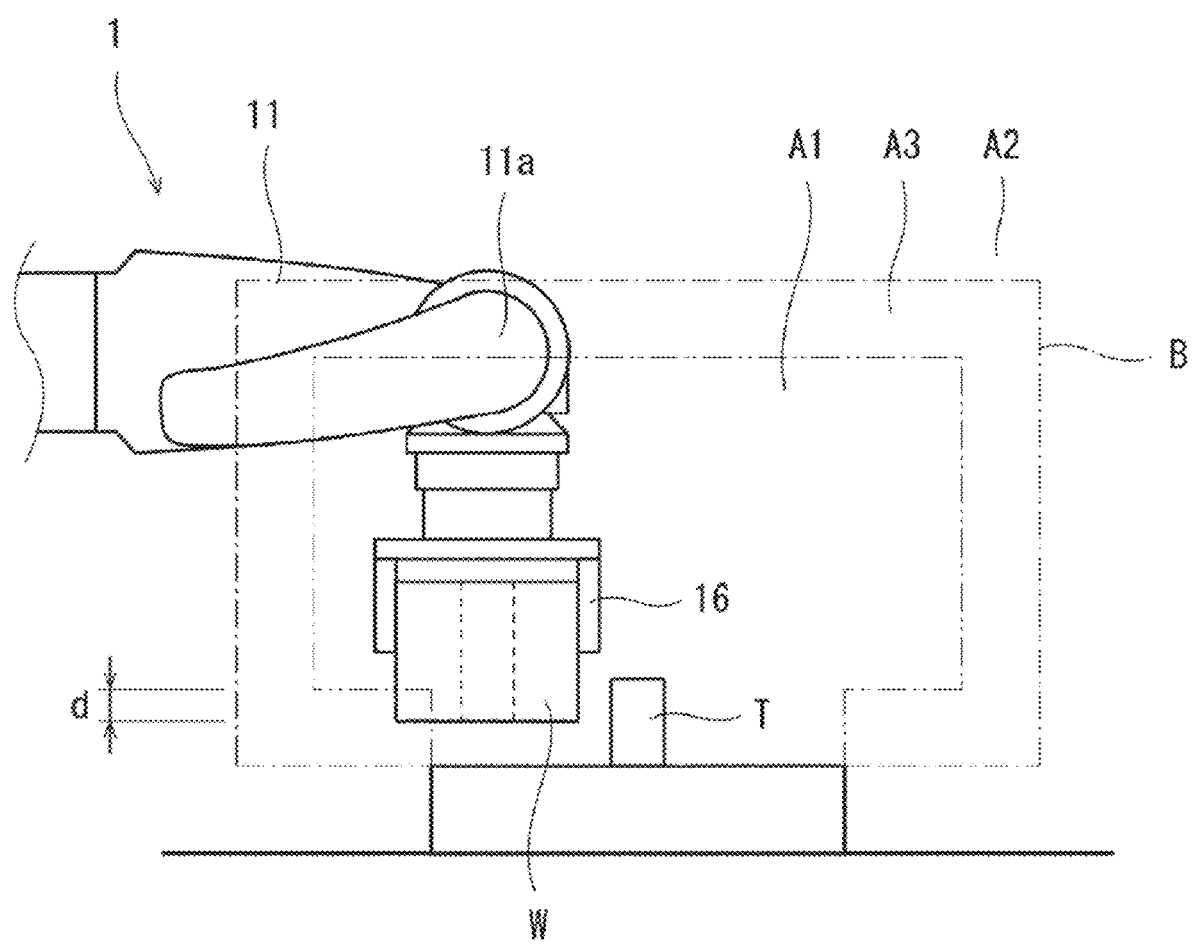
FIG. 8 is a view illustrating one example of operation of the robot system according to Embodiment 2.

Next, one example of operation of the robot system 100A is described. FIGS. 7 and 8 are views illustrating one example of operation of the robot system 100A according to Embodiment 2. For example, as illustrated in FIGS. 7 and 8, in this example operation, the operator P performs a work in which the workpiece W is assembled to the object T by using the robot system 100A.

First, as illustrated in FIG. 6, the notifying range setting module 340 sets the notifying range A3.

Next, the converting module 310 calculates the target velocity vector vd at every given control period. In a state where the working end 11a is located in the operating range A1 other than the notifying range A3, the master arm 21 is not operated, and the slave arm 11 is not in contact with the environment, such as the object T, all of the operating force fm, the reaction force fs, and the repulsive force fr become zero, and the resultant force of the operating force fm, the reaction force fs, and the repulsive force fr becomes zero. Therefore, the target velocity vector vd calculated by the converting module 310 becomes the zero vector, and the slave operating command generating module 320 sets the next target position according to the slave operating command xs as the same position as the current position based on the target velocity vector vd. Then, in the subsequent control period, the slave-side controller 14 maintains the current posture of the slave arm 11 based on the slave operating command xs. Moreover, similarly to the slave operating command generating module 320, the master operating command generating module 330 sets the next target position, and the master-side controller 24 maintains the current posture of the master arm 21 similarly to the slave-side controller 14.

Next, as illustrated in FIG. 7, when the operator P applies the operating force fm in the direction the workpiece W is brought closer to the object T, i.e., applies the downward operating force fm to the manipulation end 21a of the master arm 21, the converting module 310 calculates the downward target velocity vector vd having the magnitude according to the operating force fm by using Formula (3). Note that, in the state where the workpiece W does not contact the object T, the reaction force fs is zero. Then, the slave operating command generating module 320 sets the next target position of the working end 11a of the slave operating command xs below the current position so that the working end 11a is moved downwardly at the speed according to the downward target velocity vector vd. Then, in the subsequent control period, the slave-side controller 14 changes the posture of the slave arm 11 so that the working end 11a is moved downwardly based on the slave operating command xs. Similarly, the master-side controller 24 changes the posture of the master arm 21 based on the master operating command xm so that the manipulation end 21a is moved downwardly.

Thus, the working end 11a of the slave arm 11 and the manipulation end 21a of the master arm 21 move in the same direction simultaneously. Therefore, when the operator P moves the manipulation end 21a of the master arm 21, the operator P can feel as if the working end 11a of the slave arm 11 operates so as to follow the motion of the manipulation end 21a of the master arm 21.

Then, when the working end 11a of the slave arm 11 moves downwardly, the workpiece W contacts the upper end of the object T, and when the workpiece W is pushed against the object T, the reaction force fs according to the magnitude of the pushing force is detected by the slave-side force detector 12. Then, from this state, even when the operator P applies the strong downward operating force fm against the manipulation end 21a, the reaction force fs increases in proportion to the operating force fm, and the difference between the operating force fm and the reaction force fs becomes substantially zero, and therefore, the target velocity vector vd calculated by the converting module 310 becomes the zero vector. Therefore, the slave operating command generating module 320 sets the next target position according to the slave operating command xs as the same position as the current position based on the target velocity vector vd. Then, in the subsequent control period, the slave-side controller 14 maintains the current posture of the slave arm 11 based on the slave operating command xs. Similarly to the slave operating command generating module 320, the master operating command generating module 330 sets the next target position, and the master-side controller 24 maintains the current posture of the master arm 21 similarly to the slave-side controller 14.

Thus, when the workpiece W is pushed against the object T, the master-side controller 24 maintains the current posture of the master arm 21 based on the master operating command xm, operates the manipulation end 21a so that the manipulation end 21a of the master arm 21 resists the operating force fm, and changes the operation of the manipulation end 21a. Therefore, the reaction force fs which acts on the working end 11a of the slave arm 11 can be presented to the operator P through the manipulation end 21a of the master arm 21. Therefore, the operator P can perform the work while recognizing the reaction force fs through the inner force sense of the operator P, when the working end 11a contacts the environment. This work is a work in which, for example, in the state illustrating in FIG. 7, the workpiece W is moved in the direction perpendicular to the reaction force while the workpiece W is pushed against the object T to explore the position at which the through-hole Wa and the object T fit. The operator P can perform the work efficiently because he/she can recognize the exploring direction of the fitting position of the object T (i.e., the direction which intersects perpendicular to the reaction force fs) by recognizing the direction of the reaction force fs.

Meanwhile, as illustrated in FIG. 8, the operator P moves the working end 11a of the slave arm 11 downwardly at the location where the object T does not exist in the plan view, and when the workpiece W enters into the notifying range A3 without being pushed against the object T, the repulsive force setting module 350 determines that the target position of the working end 11a of the slave operating command xs is located inside the notifying range A3, and calculates the repulsive force fr by using Formula (4). Then, the converting module 310 calculates the target velocity vector vd having the magnitude according to the resultant force of the operating force fm and the repulsive force fr by using Formula (3). Note that, in the state illustrated in FIG. 8 where the workpiece W does not contact the object T, the reaction force fs is zero.

At this time, in FIG. 8, as for normal direction components at the boundary B between the repulsive force fr and the operating force fm, the normal direction component of the repulsive force fr is oriented to the opposite side of the normal direction component of the operating force fm (opposite sign). Therefore, as for the resultant force acquired by synthesizing the repulsive force fr with the operating force fm, the component of the resultant force toward the boundary B becomes smaller, and the component of the target velocity vector vd toward the boundary B (the component of the target velocity vector vd in the normal direction of the boundary B) also becomes smaller.

Then, the slave operating command generating module 320 sets the next target position of the working end 11a of the slave operating command xs as the position below the current position based on the target velocity vector vd so that the working end 11a is moved downwardly at a speed slower than the speed before entering into the notifying range A3. Then, in the subsequent control period, the slave-side controller 14 changes the posture of the slave arm 11 based on the slave operating command xs so that the working end 11a is moved downwardly. Similarly to the slave operating command generating module 320, the master operating command generating module 330 sets the next target position, and similarly to the slave-side controller 14, the master-side controller 24 changes the posture of the master arm 21 based on the master operating command xm so that the manipulation end 21a is moved downwardly. Therefore, the system controller 3A can give the operator P such a sensation that the operation of the working end 11a and the manipulation end 21a became heavier, and can notify the operator P about an approach to the limit of the operating range A1.

Note that, as the distance between the target position of the working end 11a of the slave operating command xs and the limit of the operating range A1 decreases, the magnitude of the repulsive force fr set by the repulsive force setting module 350 becomes larger, the target velocity vector vd becomes smaller, and the speeds of the working end 11a and the manipulation end 21a become slower. Further, when the repulsive force fr exceeds the operating force fm, the sign of the target velocity vector vd is reversed, and the working end 11a and the manipulation end 21a are moved so that they are pushed back. Thus, since the direction of the repulsive force fr turns to the direction separating from the limit of the operating range A1, and the magnitude of the repulsive force fr becomes larger as the distance between the target position of the working end 11a of the slave operating command xs and the limit of the operating range A1 decreases, the operator P can be guided intelligibly about the direction separating from the boundary B.

Then, the slave operating command generating module 320 regulates the entering of the working end 11a into the entering prohibited range A2, when the next target position of the working end 11a reaches the boundary B.

Thus, when the workpiece W contacts the object T, the operator P becomes suddenly impossible to move the manipulation end 21a in the direction corresponding to the direction of pushing the workpiece W against the object T. On the other hand, when the working end 11a enters into the notifying range A3, the operator P perceives the operation of the manipulation end 21a gradually heavier as it approaches the limit of the operating range A1. Therefore, the operator P can easily distinguish whether the working end 11a contacts the workpiece W, or whether the working end 11a approaches the limit of the operating range A1. Therefore, for example, the operator P can be prevented from erroneously recognizing that the working end 11a is in contact with the workpiece W, in spite of being in the state where the working end 11a reaches the limit of the operating range A1 and the operations of the working end 11a and the manipulation end 21a are regulated. Thus, a wrong work (assembly at a wrong location) can be prevented, and the work efficiency can be improved.

Modification 2 of Embodiment 2

Figure 9:
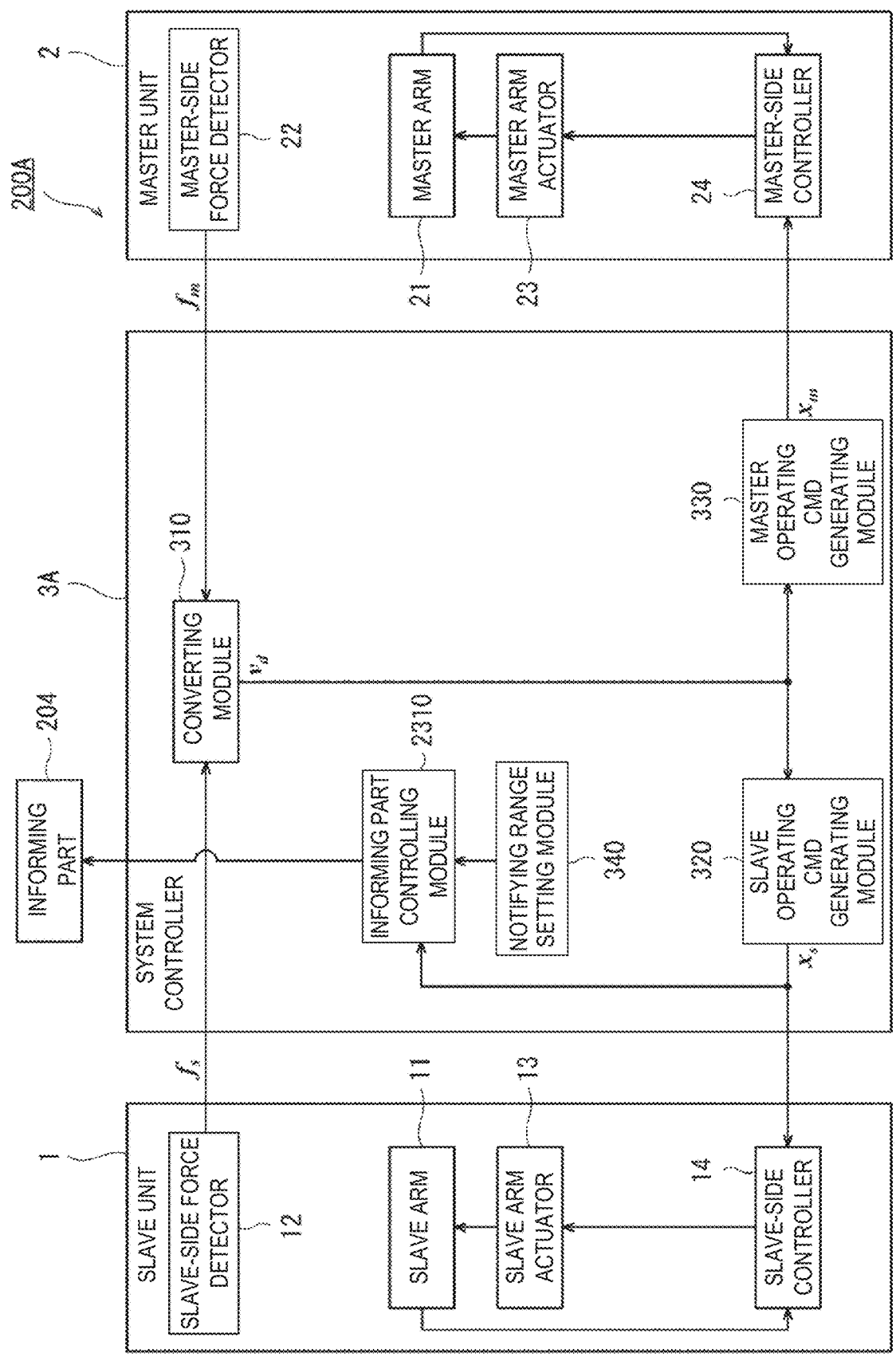
FIG. 9 is a block diagram schematically illustrating one example of a configuration of a control system of a robot system according to Modification 2 of Embodiment 2.

Below, a configuration and operation of Modification 2 of Embodiment 2 are described focusing on the difference from Embodiment 2. FIG. 9 is a block diagram schematically illustrating one example of a configuration of a control system of a robot system 200A according to Modification 2 of Embodiment 2.

In this modification, the robot system 200A is also further provided with the informing part 204 similarly to Modification 1 of Embodiment 1. Moreover, in this modification, the system controller 3A is also further provided with an informing part controlling module 2310 similarly to Modification 1 of Embodiment 1. Note that, in FIG. 9, although the repulsive force setting module 350 is not illustrated, it may be included as a functional block.

When the informing part controlling module 2310 determines that the target position of the working end 11a of the slave operating command xs is located in the notifying range A3, it controls the informing part 204 to inform it to the operator P. Thus, it can inform the operator P about the approaching to the limit of the operating range A1 (i.e., the boundary B).

Moreover, the informing part controlling module 2310 controls the informing part 204 so that the intensity of the sense information becomes stronger as the distance between the target position of the working end 11a of the slave operating command xs and the boundary B decreases. Therefore, the operator P can be guided intelligibly about the direction separating from the boundary B.

Note that, in Embodiment 2 and Modification 2, the operating range A1 is set for the working end 11a, and is set as a range which permits operation of the working end 11a in this range. The present disclosure is not limited to this configuration, but, alternatively, the operating range A1 may be set for the manipulation end 21a and may be set as a range which permits operation of the manipulation end 21a in this range. In this case, the system controller 3A controls the system to inform the operator P that the manipulation end 21a approaches the limit of the operating range A1.

Moreover, the operating range may be set for each of the working end 11a and the manipulation end 21a. In this case, the system controller 3A may control the system to inform the operator P at least either one of that the working end 11a approaches the limit of that operating range or that the manipulation end 21a approaches the limit of the operating range.

Moreover, in Embodiment 2 and Modification 2, the converting module 310 calculates the target velocity vector vd based on the resultant force of the operating force fm, the reaction force fs, and the repulsive force fr, by using Formula (3). The present disclosure is not limited to this configuration, but, alternatively, the converting module 310 may change the coefficient of viscosity cv of Formula (3) so that the magnitude of the coefficient of viscosity cv of Formula (3) becomes larger as the distance between the target position of the working end 11a of the slave operating command xs and the limit of the operating range A1 decreases, without including the repulsive force fr in the resultant force.

It is apparent for the person skilled in the art that many improvements and other embodiments of the present disclosure are possible from the above description. Therefore, the above description is to be interpreted only as illustration, and it is provided in order to teach the person skilled in the art the best mode that implements the present disclosure. The details of the structures and/or the functions may be changed substantially, without departing from the present disclosure.

DESCRIPTION OF REFERENCE CHARACTERS

W Workpiece
T Object
P Operator
1 Slave Unit
2 Master Unit
3, 3A System Controller
11a Working End
11 Slave Arm
12 Slave-side Force Detector
13 Slave Arm Actuator
14 Slave-side Controller
21 Master Arm
21a Manipulation End
22 Master-side Force Detector
23 Master Arm Actuator
24 Master-side Controller
100, 100A, 200, 200A Robot System

What is claimed is:

1. A robot system, comprising:
a slave arm having a working end;
a master arm having a manipulation end into which content of manipulation is inputted, the content of manipulation comprising a direction and an operating force input to the manipulation end; and
a system controller configured to perform operations comprising generating a slave operating command for defining a target position of the working end based on the content of manipulation inputted into the manipulation end, wherein
the slave operating command comprises a limit equivalent range corresponding to a limit of operation of at least one of the slave arm and the master arm, and
the system controller performs operations further comprising
determining that the operating force exceeds a threshold of the limit equivalent range, and
processing to give a perception through the manipulation end by applying a force to the manipulator end in the same direction as the operating force.

2. The robot system of claim 1, wherein
the system controller is further configured to perform operations comprising generating the master operating command based on the content of manipulation inputted into the manipulation end the master arm and a master operating command for defining a target position of the manipulation end, and
the master operating command is generated for increasing a change in a moving velocity of the manipulation end as the operating force increases.

3. The robot system of claim 1, wherein
the system controller is configured to perform operations further comprising
determining that a magnitude of the operating force applied to the manipulation end as the content of manipulation is included in a range exceeding a third threshold as the limit equivalent range, and
performing control to provide the perception.

4. The robot system of claim 3, wherein the system controller is configured to perform operations further comprising performing control to provide the perception by controlling an intensity of the perception such that the perception becomes stronger as the operating force becomes larger.

5. The robot system of claim 1, wherein
the system controller is configured to perform operations further comprising
determining that the target position of the working end of the slave arm based on the slave operating command is located in a notifying range, and
performing control to provide the perception.

6. The robot system of claim 5, wherein the system controller is configured to perform operations further comprising performing control to provide the perception by controlling an intensity of the perception such that the perception becomes stronger as a distance between the target position of the working end of the slave operating command and the limit of the operating range becomes smaller.

7. A method of controlling a robot system comprising a slave arm and a master arm, the method comprising:
outputting a slave operating command for defining a target position of a working end of the slave arm to a slave-side controller configured to control an actuator of the slave arm based on the slave operating command, the slave operating command generated based on content of manipulation inputted into a manipulation end of the master arm, the content of manipulation comprising a direction and an operating force input to the manipulation end, wherein the slave operating command comprises a limit equivalent range corresponding to a limit of operation of at least one of the slave arm and the master arm,
determining that the operating force exceeds a threshold of the limit equivalent range, and
controlling the manipulation end of the master arm to give a perception through the manipulation end by applying a force to the manipulator end in the same direction as the operating force.

8. The method of claim 7, further comprising setting a notifying range that spreads from a limit of a given operating range to an area within the given operating range on the given operating range side as the limit equivalent range,
wherein, based on determining that the target position of the working end of the slave operating command is located in the notifying range, performing a notification by outputting a command to control the manipulation end to provide the perception.

9. A robot system, comprising:
a slave arm having a working end;
a master arm having a manipulation end into which content of manipulation is inputted, the content of manipulation comprising a direction and an operating force input to the manipulation end; and
a system controller configured to perform operations comprising generating a slave operating command for defining a target position of the working end based on the content of manipulation inputted into the manipulation end, wherein:
the slave operating command comprises a limit equivalent range corresponding to a limit of operation of at least one of the slave arm and the master arm,
the system controller performs operations further comprising:
determining that the operating force exceeds a threshold of the limit equivalent range;
processing to give a perception through the manipulation end by applying a force to the manipulator end;
generating, based on the operating force and a reaction force acting on the working end or a workpiece held by the working end, the slave operating command and the master operating command for moving the manipulation end in a moving direction corresponding to a moving direction of the working end of the slave operating command;

based on determining that the magnitude of the operating force exceeding a first threshold as the limit equivalent range, generating the master operating command for providing the perception by applying the force and moving the manipulation end in the direction of the operating force; generating a first temporary master operating command for moving the manipulation end in a moving direction corresponding to a moving direction of the working end commanded by a slave operating command generated based on the operating force and the reaction force;

generating a second temporary master operating command based on the operating force; and setting the first temporary master operating command to the master operating command in a normal operating mode, and setting the second temporary master operating command to the master operating command in an informing operating mode; and based on the magnitude of the operating force exceeding the first threshold, setting the operating mode to the informing operating mode.

* * * * *